(12) United States Patent
Miyazaki

(10) Patent No.: US 11,017,029 B2
(45) Date of Patent: May 25, 2021

(54) DATA TRANSFER SYSTEM, DATA TRANSFER APPARATUS, DATA TRANSFER METHOD, AND COMPUTER-READABLE RECORDING MEDIUM

(71) Applicant: NEC Solution Innovators, Ltd., Tokyo (JP)

(72) Inventor: Tohru Miyazaki, Tokyo (JP)

(73) Assignee: NEC Solution Innovators, Ltd., Tokyo (JP)

(*) Notice: Subject to any disclaimer, the term of this patent is extended or adjusted under 35 U.S.C. 154(b) by 287 days.

(21) Appl. No.: 16/096,352

(22) PCT Filed: Apr. 27, 2017

(86) PCT No.: PCT/JP2017/016866
§ 371 (c)(1),
(2) Date: Oct. 25, 2018

(87) PCT Pub. No.: WO2017/188417
PCT Pub. Date: Nov. 2, 2017

(65) Prior Publication Data
US 2019/0129907 A1 May 2, 2019

(30) Foreign Application Priority Data
Apr. 28, 2016 (JP) .............................. JP2016-090725

(51) Int. Cl.
*G06F 16/00* (2019.01)
*G06F 16/904* (2019.01)
(Continued)

(52) U.S. Cl.
CPC .......... *G06F 16/904* (2019.01); *G06F 16/447* (2019.01); *G06F 21/60* (2013.01); *G06F 21/62* (2013.01); *G06F 40/20* (2020.01)

(58) Field of Classification Search
CPC .................................................... G06F 16/447
See application file for complete search history.

(56) References Cited

U.S. PATENT DOCUMENTS

2011/0041146 A1* 2/2011 Lewis ...................... H04N 5/93
725/5
2012/0137343 A1 5/2012 Uchida

FOREIGN PATENT DOCUMENTS

JP 2006-085395 A 3/2006
JP 2013-125414 A 6/2013
(Continued)

OTHER PUBLICATIONS

International Search Report for PCT Application No. PCT/JP2017/016866, dated Jul. 25, 2017.

*Primary Examiner* — Ajith Jacob
(74) *Attorney, Agent, or Firm* — Sughrue Mion, PLLC

(57) ABSTRACT

A data transfer system includes a management server 1 for managing user information, browsing setting information that defines a user who can browse data, and transfer setting information that designates a transfer destination of the data, a data transfer apparatus 2 for setting, for the data, browsing authorization that allows only a specific user to browse the content of the data, based on the user information and the browsing setting information, and transferring the data for which the browsing authorization is set to the designated transfer destination based on the transfer setting information, and a data browsing apparatus 3 for determining whether or not a user has the browsing authorization that is set for the data, based on the user information, the browsing setting information, and the transfer setting information, and presenting the content of the data to the user if the user has the browsing authorization.

18 Claims, 30 Drawing Sheets

(51) Int. Cl.
    *G06F 21/62*     (2013.01)
    *G06F 21/60*     (2013.01)
    *G06F 40/20*     (2020.01)
    *G06F 16/44*     (2019.01)

(56) References Cited

FOREIGN PATENT DOCUMENTS

| | | |
|---|---|---|
| JP | 2014-146068 A | 8/2014 |
| WO | 2011/018937 A1 | 2/2011 |

\* cited by examiner

Fig.3

TERMINAL INFORMATION

| TERMINAL ID | TERMINAL TYPE | IDENTIFICATION INFORMATION TYPE | IDENTIFICATION INFORMATION |
|---|---|---|---|
| D101 | SERVICE SERVER | IP ADDRESS | 192.168.1.1 |
| D102 | DATA TRANSFER APPARATUS | IP ADDRESS | 192.168.1.2 |
| D103 | SENSOR | MAC ADDRESS | 12-34-56-78-90-AA |
| D104 | SENSOR | MAC ADDRESS | 12-34-56-78-90-BB |
| D202 | DATA BROWSING APPARATUS | IP ADDRESS | 192.168.2.2 |
| : | : | : | : |

Fig.4

ANALYSIS PROCEDURE INFORMATION

1ST TO 8TH BYTES  SENSOR ID
9TH TO 10TH BYTES  DATA TYPE
11TH TO 12TH BYTES DATA VALUE
TEMPERATURE (°C) IF DATA TYPE=1
HUMIDITY (%RH) IF DATA TYPE=2

Fig.5

USER INFORMATION

| USER ID | USER NAME |
|---------|-----------|
| U001 | USER a |
| U002 | USER b |
| U003 | USER c |
| U004 | USER d |
| : | : |

Fig.6

TRANSFER SETTING INFORMATION

| TRANSFER SOURCE TERMINAL ID | TRANSFER DESTINATION TERMINAL ID | DATA TYPE |
|---|---|---|
| D101 | D202 | TEMPERATURE |
| D101 | D202 | HUMIDITY |
| : | : | : |

Fig.7

BROWSING SETTING INFORMATION

| TRANSMISSION SOURCE TERMINAL ID | BROWSABLE DATA TYPE | ID OF USER WHO CAN BROWSE DATA | ID OF GROUP THAT CAN BROWSE DATA |
|---|---|---|---|
| D101 | TEMPERATURE | U002 | |
| D101 | TEMPERATURE | | G001 |
| ⋮ | ⋮ | ⋮ | ⋮ |

Fig.8

GROUP INFORMATION

| GROUP ID | USER ID |
|---|---|
| G001 | U001 |
| G001 | U003 |
| G001 | U004 |
| G002 | U002 |
| : | : |

| | |
|---|---|
| TERMINAL ID | D103 |
| TRANSMISSION DATE AND TIME | 10:14:21, FEBRUARY 1, 2016 |
| TYPE | TEMPERATURE SENSOR |
| VALUE | 27°C |

Fig.20

TERMINAL INFORMATION

| TERMINAL ID | TERMINAL TYPE | IDENTIFICATION INFORMATION TYPE | IDENTIFICATION INFORMATION |
|---|---|---|---|
| D101 | SERVICE SERVER 4A | IP ADDRESS | 192.168.1.1 |
| D102 | DATA TRANSFER APPARATUS 2A | IP ADDRESS | 192.168.1.2 |
| D103 | SENSOR 5A | MAC ADDRESS | 12-34-56-78-90-AA |
| D201 | SERVICE SERVER 4B | IP ADDRESS | 192.168.2.1 |
| D202 | DATA TRANSFER APPARATUS 2B | IP ADDRESS | 192.168.2.2 |
| D001 | DATA BROWSING APPARATUS 3 | IP ADDRESS | 192.168.100.1 |
| | | | |

Fig.21

ANALYSIS PROCEDURE INFORMATION

| TERMINAL ID | ANALYSIS PROCEDURE | |
|---|---|---|
| D103 | 1ST TO 6TH BYTES | MAC ADDRESS |
| | 7TH TO 10TH BYTES | TIME |
| | 11TH BYTE | TEMPERATURE (°C) |

Fig.22

USER INFORMATION

| USER ID | USER NAME |
|---|---|
| U001 | USER 7A |
| U002 | USER 7B |

Fig.23

TRANSFER SETTING INFORMATION

| TRANSFER SOURCE TERMINAL ID | TRANSFER DESTINATION TERMINAL ID | DATA TYPE |
|---|---|---|
| D102 | D202 | TEMPERATURE |
| D102 | D001 | HUMIDITY |
| D202 | D001 | HUMIDITY |

Fig.24

BROWSING SETTING INFORMATION

| TRANSMISSION SOURCE TERMINAL ID | BROWSABLE DATA TYPE | ID OF USER WHO CAN BROWSE DATA | ID OF GROUP THAT CAN BROWSE DATA |
|---|---|---|---|
| D103 | TEMPERATURE | U001 | |
| D103 | TEMPERATURE | U002 | |

Fig.25(a)

CONTENT OF BROWSING SETTING INFORMATION ACCUMULATION UNIT 110

| TRANSMISSION SOURCE TERMINAL ID | BROWSABLE DATA TYPE | ID OF USER WHO CAN BROWSE DATA | ID OF GROUP THAT CAN BROWSE DATA |
|---|---|---|---|
| D103 | TEMPERATURE | U001 | |
| D103 | TEMPERATURE | U002 | |

CONTENT OF GROUP INFORMATION ACCUMULATION UNIT 112

| GROUP ID | USER ID |
|---|---|
| | |

Fig.25(b)

CONTENT OF BROWSING SETTING INFORMATION ACCUMULATION UNIT 110

| TRANSMISSION SOURCE TERMINAL ID | BROWSABLE DATA TYPE | ID OF USER WHO CAN BROWSE DATA | ID OF GROUP THAT CAN BROWSE DATA |
|---|---|---|---|
| D103 | TEMPERATURE | | G001 |
| D103 | TEMPERATURE | U002 | |

CONTENT OF GROUP INFORMATION ACCUMULATION UNIT 112

| GROUP ID | USER ID |
|---|---|
| G001 | U001 |

Fig.25(c)

CONTENT OF BROWSING SETTING INFORMATION ACCUMULATION UNIT 110

| TRANSMISSION SOURCE TERMINAL ID | BROWSABLE DATA TYPE | ID OF USER WHO CAN BROWSE DATA | ID OF GROUP THAT CAN BROWSE DATA |
|---|---|---|---|
| D103 | TEMPERATURE | | G001 |

CONTENT OF GROUP INFORMATION ACCUMULATION UNIT 112

| GROUP ID | USER ID |
|---|---|
| G001 | U001 |
| G001 | U002 |

```
TERMINAL ID    D103
TIME           10:29:03, FEBRUARY 24, 2016
TYPE           TEMPERATURE
VALUE          16°C
```

Fig.28

| | |
|---|---|
| TERMINAL ID | D103 |
| TIME | 10:29:03, FEBRUARY 24, 2016 |
| TYPE | TEMPERATURE |
| VALUE | 16°C |
| ID OF GROUP THAT CAN BROWSE DATA | G001 |

Fig.29

| | |
|---|---|
| TERMINAL ID | D103 |
| TIME | 10:29:03, FEBRUARY 24, 2016 |
| TYPE | TEMPERATURE |
| VALUE | 16°C |
| ID OF GROUP THAT CAN BROWSE DATA | G001 |
| TRANSFER DESTINATION TERMINAL ID | D202 |
| TRANSFER DESTINATION TERMINAL ID | D001 |

Fig.30

| | |
|---|---|
| TERMINAL ID | D103 |
| TIME | 10:29:03, FEBRUARY 24, 2016 |
| TYPE | TEMPERATURE |
| VALUE | 16°C |
| ID OF GROUP THAT CAN BROWSE DATA | G001 |
| TRANSFER DESTINATION TERMINAL ID | D001 |

DATA TRANSFER SYSTEM, DATA TRANSFER APPARATUS, DATA TRANSFER METHOD, AND COMPUTER-READABLE RECORDING MEDIUM

This application is a National Stage Entry of PCT/JP2017/016866 filed on Apr. 27, 2017, which claims priority from Japanese Patent Application 2016-090725 filed on Apr. 28, 2016, the contents of all of which are incorporated herein by reference, in their entirety.

TECHNICAL FIELD

The present invention relates to a data transfer system, a data transfer apparatus, and a data transfer method for sharing data output from a sensor between a plurality of services that use the sensor, and furthermore relates to a computer-readable recording medium that records a program for realizing the same.

BACKGROUND ART

Service providers have proposed a variety of services to be provided to users including, for example, a traffic information providing service using positional information obtained from a car navigation system of an automobile, a health management service using biological information (body temperature, pulse rate, blood pressure etc.) obtained from a wearable sensor, and so on. In these services, ordinarily, a sensor provided by a service provider detects information regarding the environment around a user or regarding a user, and transmits measured sensor data to a server prepared by the service provider.

Due to such a configuration, in a case where another service provider attempts to construct a new service, it is difficult to use an existing sensor as-is, and this service provider needs to provide another sensor for the new service. This results in high initial costs, and requires a lot of time until the service can start. Moreover, if a sensor is provided for every service, to a user who uses the services, the user will have problems in that a large amount of space will be occupied, and a lot of time and effort is required to manage these sensors.

In view of this, a mechanism is required for linking a plurality of services to distribute sensor data between service providers. By using such a mechanism, data output from an existing sensor (hereinafter, "sensor data") can be used to establish a new service, and furthermore, an existing service provider can realize a new business of selling sensor data.

However, to realize such a mechanism to deliver sensor data, a mechanism is also required to ensure security, e.g. to prevent leakage of personal information contained in sensor data to be distributed between service providers, and control the disclosure of information to so that the information cannot be browsed by a third party.

For example, Patent Document 1 discloses a data distribution system that allows a plurality of systems to join the data distribution system and allows them to openly trade data. The system disclosed in Patent Document 1 obtains and manages data provided by service providers, and provides data to an access requester after determining whether or not the data can be disclosed thereto, thereby ensuring security.

LIST OF PRIOR ART DOCUMENTS

Patent Document

Patent Document 1: JP 2014-146068A

DISCLOSURE OF THE INVENTION

Problems to be Solved by the Invention

The system disclosed in Patent Document 1 normalizes sensor data fetched from a plurality of services, and places the normalized sensor data to a database in the system. Thereafter, the system determines whether or not to disclose the sensor data when this sensor data is requested, and provides the sensor data to the requester who requested the sensor data if it can be disclosed thereto.

However, the system disclosed in Patent Document 1 does not have a means for protecting sensor data after being provided to the requester who requested the sensor data. For this reason, if sensor data has leaked from a path for providing the sensor data to the requester, or if the sensor data has leaked after being provided to the requester, the system cannot prevent the disclosure of the sensor data.

Known data protection means include, for example, DRM (Digital Rights Management), which is a means for protecting data such as moving images, music, and files. Meanwhile, DRM is based on the premise of protecting a single file, and is not applicable to cases where many sets of small-size data are sequentially transmitted every several seconds, as in the case of sensor data. Thus, it is difficult to protect each set of transmitted data by using DRM.

It is also conceivable that protection of sensor data can be realized by setting, for every set of data to be transmitted, access authorization for each of a plurality of users who use the services. However, in this case, the scale of access authorization to be provided to each set of data is very large. As a result, network traffic increases, inhibiting data distribution.

An example of an object of the present invention is to solve the foregoing problems, and provide a data transfer system, a data transfer apparatus, a data transfer method, and a computer-readable recording medium that can ensure safety in the exchanging of sensor data while suppressing an increase in the amount of transferred data, in a case of sharing sensor data between services that use a sensor.

Means for Solving the Problems

To achieve the above-stated object, a data transfer system according to an aspect of the present invention is a system for sharing, between a plurality of services, data output from a sensor capable of being used in the services, the system including:

a management server for managing user information that specifies users who use the services, browsing setting information that defines, for each type of the data, a user who can browse content of the data, and transfer setting information designates a transfer destination of the data;

a data transfer apparatus for acquiring the user information, the browsing setting information, and the transfer setting information from the management server, setting, for the data, browsing authorization that allows only a specific user to browse the content of the data, based on the user information and the browsing setting information, and transferring the data for which the browsing authorization is set to the designated transfer destination, based on the transfer setting information; and a data browsing apparatus for determining, upon receiving the data for which the browsing authorization is set, whether or not a specific user has the browsing authorization that is set for the received data, based on the user information, the browsing setting information, and the transfer setting information acquired from the management server, and presenting content of the received data to the specific user if the specific user has the browsing authorization.

To achieve the above-stated object, a data transfer apparatus according to an aspect of the present invention is a apparatus for sharing, between a plurality of services, data output from a sensor that can be used in the services, the apparatus including:

a browsing authorization providing unit for setting, for the data, browsing authorization that allows only a specific user to browse content of the data, based on user information that specifies users who use the services, and browsing setting information that defines, for each type of the data, a user who can browse the content of the data, and for transferring the data for which the browsing authorization is set to a designated transfer destination, based on transfer setting information that designates the transfer destination of the data.

To achieve the above-stated object, a data transfer method according to an aspect of the present invention is a method for sharing, between a plurality of services, data output from a sensor that can be used in the services, the method including:

a step (a) of managing user information that specifies users who use the services, browsing setting information that defines, for each type of the data, a user who can browse content of the data, and transfer setting information that designates a transfer destination of the data, by a management server;

a step (b) of acquiring the user information, the browsing setting information, and the transfer setting information from the management server, setting, for the data, browsing authorization that allows only a specific user to browse the content of the data, based on the user information and the browsing setting information, and transferring the data for which the browsing authorization is set to the designated transfer destination, based on the transfer setting information, by a data transfer apparatus; and a step (c) of determining, upon receiving the data for which the browsing authorization is set, whether or not a specific user has the browsing authorization that is set for the received data, based on the user information, the browsing setting information, and the transfer setting information acquired from the management server, and presenting content of the received data to the specific user if the specific user has the browsing authorization, by a data browsing apparatus.

Furthermore, to achieve the above-stated object, a computer-readable recording medium according to an aspect of the present invention is a computer-readable recording medium storing a program for sharing, between a plurality of services, data output from a sensor that can be used in the services, using a computer, the program including a command to cause the computer to perform:

a step (a) of setting, for the data, browsing authorization that allows only a specific user to browse content of the data, based on user information that specifies users who use the services, and browsing setting information that defines, for each type of the data, a user who can browse the content of the data; and a step (b) of transferring the data for which the browsing authorization is set to a designated transfer destination, based on transfer setting information that designates the transfer destination of the data.

Advantageous Effects of the Invention

As described above, according to the present invention, it is possible to ensure safety in the exchanging of sensor data while suppressing an increase in the amount of transferred data in the case of sharing sensor data between services that use a sensor.

BRIEF DESCRIPTION OF THE DRAWINGS

FIG. 3 shows an example of terminal information used in the embodiment of the present invention.

FIG. 4 shows an example of analysis procedure information used in the embodiment of the present invention.

FIG. 5 shows an example of user information used in the embodiment of the present invention.

FIG. 6 shows an example of transfer setting information used in the embodiment of the present invention.

FIG. 7 shows an example of browsing setting information used in the embodiment of the present invention.

FIG. 8 shows an example of group information used in the embodiment of the present invention.

FIG. 10 illustrates an example of sensor data to be transferred according to the embodiment of the present invention.

FIG. 11 illustrates an example of encoded data generated according to the embodiment of the present invention.

FIG. 20 shows terminal information used in Example 1 of the present invention.

FIG. 21 shows analysis procedure information used in Example 1 of the present invention.

FIG. 22 shows user information used in Example 1 of the present invention.

FIG. 23 shows transfer setting information used in Example 1 of the present invention.

FIG. 24 shows browsing setting information used in Example 1 of the present invention.

FIG. 25 illustrates changes in the content of a browsing setting information accumulation unit and the content of a group information accumulation unit according to Example 1 of the present invention, and FIGS. 25(a) to 25(c) illustrate a process of a series of changes.

FIG. 26 shows sensor data that is output in Example 1 of the present invention.

FIG. 27 shows encoded data that is generated in Example 1 of the present invention.

FIG. 28 shows encoded data in which browsing setting information is provided in Example 1 of the present invention.

FIG. 29 shows encoded data in which transfer setting information is provided in Example 1 of the present invention.

FIG. 30 shows encoded data in which transfer setting information is provided in Example 1 of the present invention.

MODE FOR CARRYING OUT THE INVENTION

Embodiment

Hereinafter, a data transfer system, a data transfer apparatus, a data transfer method, and a program according to the embodiment of the present invention will be described with reference to FIGS. 1 to 18.

System Configuration

Figure 1:
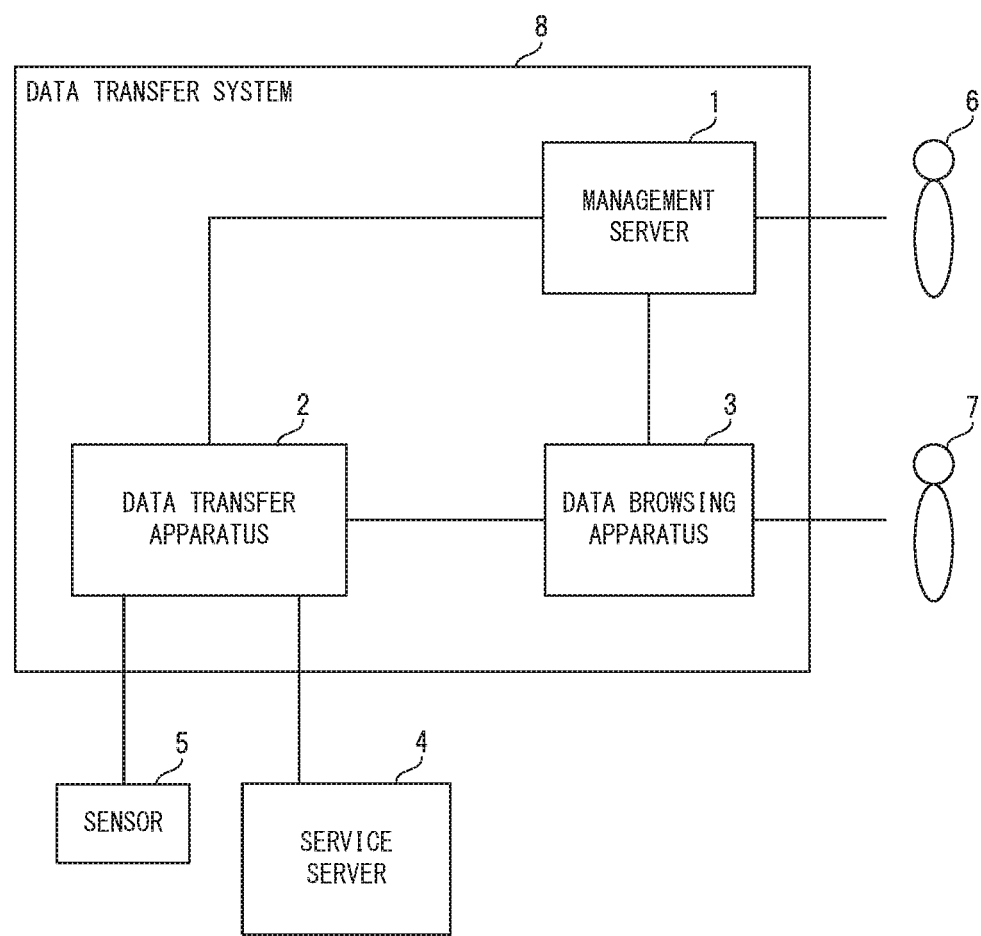
FIG. 1 is a block diagram illustrating an example of a configuration of a data transfer system according to an embodiment of the present invention.

First, an overall configuration of the data transfer system according to this embodiment will be described using FIG. 1. FIG. 1 is a block diagram illustrating an example of a configuration of the data transfer system according to the embodiment of the present invention.

A data transfer system 8 according to this embodiment shown in FIG. 1 is for sharing, between a plurality of services, data (sensor data) output from a sensor 5, which can be used in the services. As shown in FIG. 1, the data transfer system 8 includes a management server 1, a data transfer apparatus 2, and a data browsing apparatus 3. These apparatuses are connected to each other via a network.

In this embodiment, a service server 4 that is for a service provider to provide a service, and the sensor 5, which is provided by the service provider for the purpose of the service, are connected to the data transfer apparatus 2. The sensor 5 detects information regarding the environment around a user 7, or regarding the user. Examples of the sensor 5 include a temperature sensor, a humidity sensor, a body temperature sensor, a heart rate sensor, a blood pressure sensor, and so on, for example. The service server 4 provides various services, such as a health management service, based on information detected by the sensor 5.

The management server 1 manages user information that specifies a user 7 who uses the service, browsing setting information that defines, for each type of sensor data, a user 7 who can browse the content of sensor data, and transfer setting information that designates a transfer destination of the sensor data, i.e. a destination to which the sensor data is transferred.

The data transfer apparatus 2 initially acquires the user information, the browsing setting information, and the transfer setting information from the management server 1. The data transfer apparatus 2 then sets, for sensor data, browsing authorization that allows only a specific user to browse the content of the sensor data, based on the user information and the browsing setting information. Also, the data transfer apparatus 2 transfers the sensor data for which the browsing authorization is set to the designated transfer destination, based on transfer setting information.

The data browsing apparatus 3, upon receiving the sensor data for which the browsing authorization is set, determines whether or not a specific user 7 has the browsing authorization that is set for the received sensor data, based on the user information, the browsing setting information, and the transfer setting information acquired from the management server 1. If the specific user 7 has the browsing authorization, the data browsing apparatus 3 presents the content of the received sensor data to the specific user 7.

The data browsing apparatus 3 is also used for providing a service using sensor data by the service server 4. That is to say, the data browsing apparatus 3 presents, to the user 7, information created by the service server 4 based on the sensor data, e.g. information regarding health. The user 7 can browse the content of the sensor data and the information provided by the service server 4 through the data browsing apparatus 3, and thus enjoys the service.

Thus, in the data transfer system 8, only a user who has browsing authorization can browse the content of sensor data. The browsing authorization that is set for the sensor data does not need to be set for each user who uses the service. For this reason, with the data transfer system 8, the safety in the exchanging of sensor data can be ensured while suppressing an increase in the amount of transferred data in a case of sharing sensor data between services that use the sensor 5.

Although only a single service server 4 is shown in the example in FIG. 1, a plurality of service servers 4 are used in practice in accordance with the number of service providers. Also, although only one sensor 5 is shown in the example in FIG. 1, the number of sensors 5 is not particularly limited.

Configuration of Management Server

Figure 2:
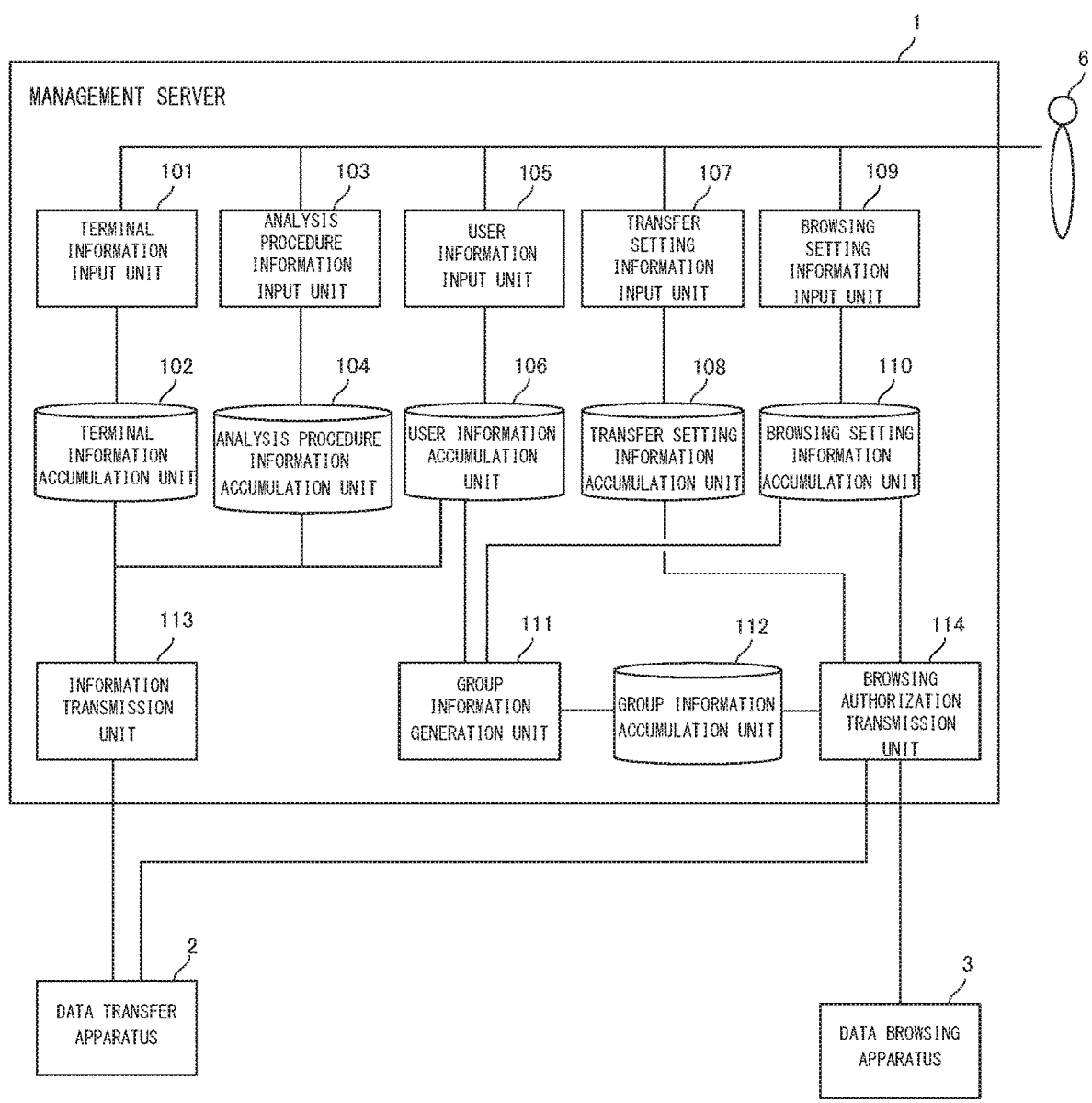
FIG. 2 is a block diagram illustrating an example of a configuration of a management server according to the embodiment of the present invention.

Subsequently, a configuration of the management server according to this embodiment will be described in detail with reference to FIGS. 2 to 8. FIG. 2 is a block diagram illustrating an example of a configuration of the management server according to the embodiment of the present invention. FIG. 3 shows an example of terminal information used in the embodiment of the present invention. FIG. 4 shows an example of analysis procedure information used in the embodiment of the present invention. FIG. 5 shows an example of user information used in the embodiment of the present invention. FIG. 6 shows an example of the transfer setting information used in the embodiment of the present invention. FIG. 7 shows an example of the browsing setting information used in the embodiment of the present invention. FIG. 8 illustrates an example of group information used in the embodiment of the present invention.

As shown in FIG. 2, the management server 1 includes a terminal information input unit 101, a terminal information accumulation unit 102, an analysis procedure information input unit 103, an analysis procedure information accumulation unit 104, a user information input unit 105, a user information accumulation unit 106, a transfer setting information input unit 107, a transfer setting information accumulation unit 108, a browsing setting information input unit 109, a browsing setting information accumulation unit 110, a group information generation unit 111, a group information accumulation unit 112, an information transmission unit 113, and a browsing authorization transmission unit 114.

In the management server 1 shown in FIG. 2, a system administrator 6 inputs various kinds of information via the input units, and causes the accumulation units to accumulate the input information. Specifically, first, the system administrator 6 inputs terminal information, which is information regarding the service server 4 and the sensor 5, to the terminal information input unit 101 that is included in the management server 1. As shown in FIG. 3, the terminal information includes a terminal ID, a terminal type, an identification information type, and identification information. The terminal information input unit 101 accumulates input terminal information in the terminal information accumulation unit 102.

Here, the terminal ID is a unique value that is assigned to each of the data transfer apparatus 2 and the data browsing apparatus 3 that constitute the data transfer system 8, as well as the service server 4, and the sensor 5 (hereinafter, these devices will be collectively called "terminals"). In the following description, these devices will be collectively referred to as "terminals". The terminal ID may be arbitrarily set by the system administrator 6, or may be automatically assigned to each terminal by the terminal information input unit 101 so as not to overlap a terminal ID that has already been accumulated in the terminal information accumulation unit 102.

The identification information type refers to the type of information to be used to identify a terminal. The identification information type may be an IP address, a MAC address, or the like, but the identification information type is not limited thereto.

Next, the system administrator 6 inputs analysis procedure information that is associated with a service provider, to the analysis procedure information input unit 103 included in the management server 1. The analysis procedure information input unit 103 accumulates the input analysis procedure information in the analysis procedure information accumulation unit 104.

Here, the analysis procedure information refers to information that defines a procedure for analyzing the content of sensor data, or more specifically, a procedure for specifying the type of sensor data, as shown in FIG. 4. In the example in FIG. 4, according to the analysis procedure information, the first to eight bytes of the sensor data indicate ID information regarding a sensor that is used in an associated service provider, the ninth and tenth bytes indicate a data type, and the eleventh and twelfth bytes indicate a data value. Furthermore, according to the analysis procedure information, the data value is a temperature value if the data type is 1, and is a humidity value if the data type is 2. Conceivable methods for describing analysis procedure information include description using script language such as JavaScript (registered trademark) or markup language such as XML (eXtensible Markup Language), but are not limited thereto.

Next, the system administrator 6 inputs user information that specifies a user 7 to the user information input unit 105 that is included in the management server 1. As shown in FIG. 5, user information includes a user ID and a user name.

The user information input unit 105 accumulates the input user information in the user information accumulation unit 106.

Here, the user ID is a unique value assigned for the entire system. The user ID may be arbitrarily set by the system administrator, or may be automatically assigned to each user by the user information input unit 105 so as not to overlap a user ID that has already been accumulated in the user information accumulation unit 106.

Next, the system administrator 6 inputs transfer setting information to the transfer setting information input unit 107 that is included in the management server 1. The transfer setting information input unit 107 accumulates the input transfer setting information in the transfer setting information accumulation unit 108. Here, the transfer setting information is information that designates a transfer destination of the sensor data received by the data transfer apparatus 2. As shown in FIG. 6, the transfer setting information includes, for example, a terminal ID of a terminal that serves as a transfer source, i.e. a terminal from which the sensor data is transferred, a terminal ID of a terminal that serves as a transfer destination, and the type of sensor data to be transferred.

Next, the system administrator 6 inputs browsing setting information to the browsing setting information input unit 109 that is included in the management server 1. The browsing setting information input unit 109 accumulates the input browsing setting information in the browsing setting information accumulation unit 110.

Here, browsing setting information defines, for each data type, a user or a group that can browse the content of the sensor data. As shown in FIG. 7, the browsing setting information includes, for example, a terminal ID of a terminal that serves as a transmission source, i.e. a terminal from which the sensor data is transmitted, the type of browsable sensor data, a user ID of a user who can browse the sensor data, and a group ID of a group that can browse the sensor data.

In the management server 1, the group information generation unit 111 initially acquires the user information accumulated in the user information accumulation unit 106, and the browsing setting information accumulated in the browsing setting information accumulation unit 110. The group information generation unit 111 then sets a group of users with the same browsable data type, based on the user information and the browsing setting information.

As shown in FIG. 8, the group information generation unit 111 also creates group information that specifies the set group, and accumulates the created group information in the group information accumulation unit 112. Furthermore, the group information generation unit 111 defines, in the browsing setting information, a group that can browse the content of each type of sensor data.

As shown in FIG. 8, the group information specifies a relation between each of a plurality of users and a group, and each user ID is associated with a group ID of a group to which the corresponding user belongs. A group ID is a unique value assigned for the entire system. The group ID is automatically assigned to each group by the group information generation unit 111 so as not to overlap a group ID that has already been accumulated in the user information accumulation unit 112. In the example in FIG. 8, there are a plurality of users who belong to one group, and for example, users with user IDs "U001", "U003", and "U004" belong to a group with the group ID "G001".

In the management server 1, the information transmission unit 113 transmits, to an information receiving unit 205 that is included in the data transfer apparatus 2, the terminal information accumulated in the terminal information accumulation unit 102, the analysis procedure information accumulated in the analysis procedure information accumulation unit 104, and the user information accumulated in the user information accumulation unit 106.

The browsing authorization transmission unit 114 transmits the transfer setting information accumulated in the transfer setting information accumulation unit 108, the browsing setting information accumulated in the browsing setting information accumulation unit 110, and the group information accumulated in the group information accumulation unit 112, to a browsing setting information receiving unit 206 that is included in the data transfer apparatus 2 and a browsing authorization receiving unit 304 that is included in the data transfer apparatus 3.

Configuration of Data Transfer Apparatus

Figure 9:
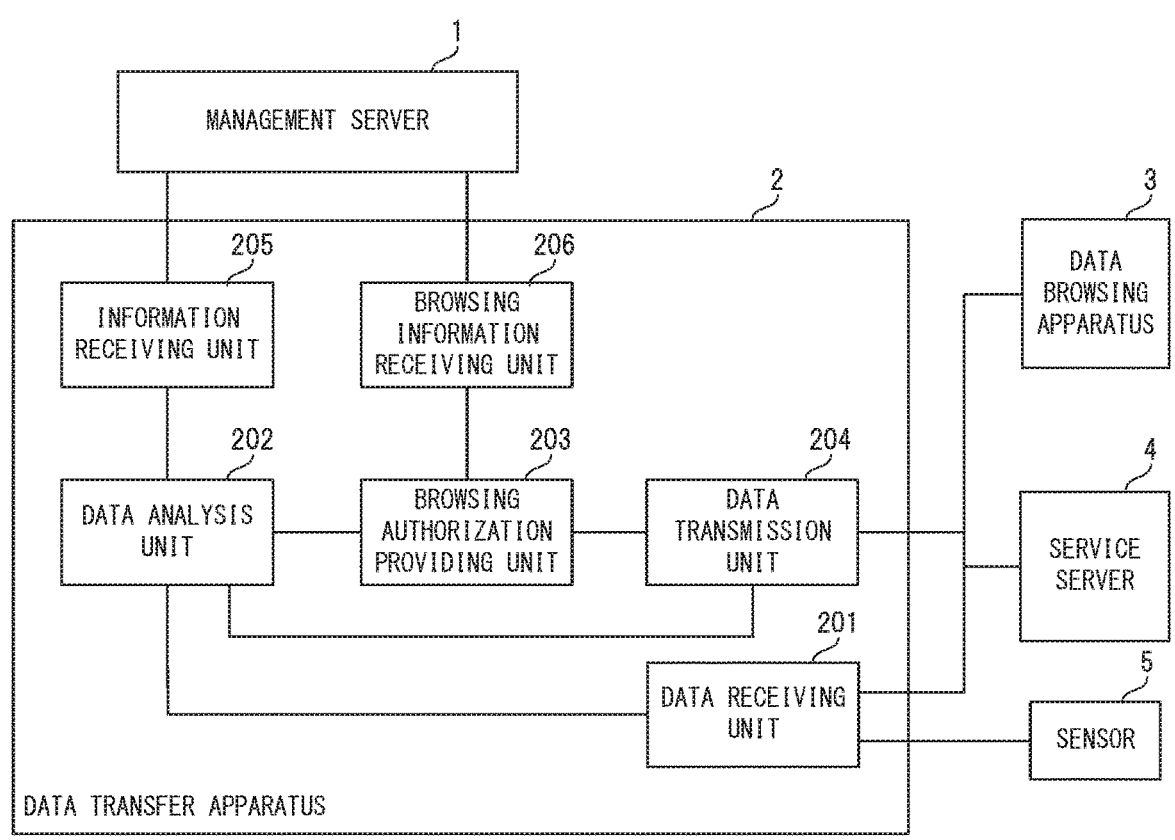
FIG. 9 is a block diagram illustrating an example of a configuration of a data transfer apparatus according to the embodiment of the present invention.
Figure 10:
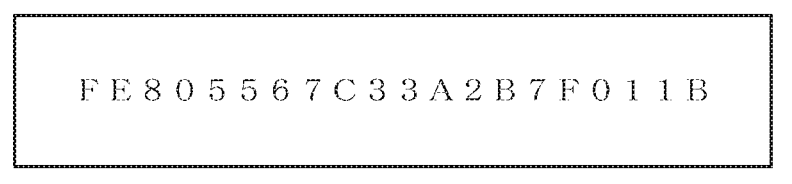

Subsequently, a configuration of the data transfer apparatus 2 according to this embodiment will be described in detail with reference to FIGS. 9 to 11. FIG. 9 is a block diagram illustrating an example of a configuration of the data transfer apparatus according to the embodiment of the present invention. FIG. 10 illustrates an example of sensor data to be transferred according to the embodiment of the present invention. FIG. 11 illustrates an example of encoded data generated according to the embodiment of the present invention.

As shown in FIG. 9, according to this embodiment, the data transfer apparatus 2 includes a data receiving unit 201, a data analysis unit 202, a browsing authorization providing unit 203, a data transmission unit 204, an information receiving unit 205, and a browsing information receiving unit 206.

The information receiving unit 205 receives the terminal information, the analysis procedure information, and the user information that are transmitted from the management server 1, and sends the received information to the data analysis unit 202. The browsing information receiving unit 206 receives the transfer setting information, the browsing setting information, and the group information that are transmitted from the management server 1, and sends the received information to the browsing authorization providing unit 203.

Figure 12:
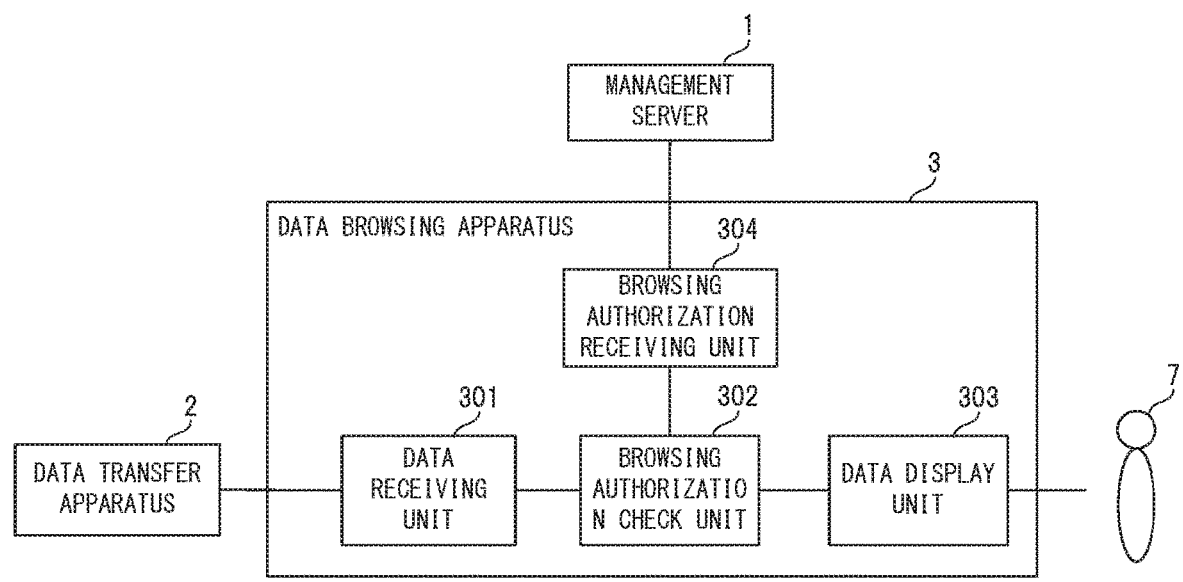
FIG. 12 is a block diagram illustrating an example of a configuration of a data browsing apparatus according to the embodiment of the present invention.

In this embodiment, a push-based communication method, in which information is transmitted from the management server 1, is employed in communication between the information transmission unit 113 and the information receiving unit 205, communication between the browsing authorization transmission unit 114 and the browsing information receiving unit 206, and communication between the browsing authorization transmission unit 114 and the browsing authorization receiving unit 304 (see FIG. 12, which will be described later). However, in this embodiment, the communication method for the aforementioned communication is not particularly limited. A pull-based communication method, in which an information request is made from the data transfer apparatus 2 or the data browsing apparatus 3 to the management server 1, and the management server 1 transmits information in response to the information request, may alternatively be employed as the communication method.

The data receiving unit 201 receives sensor data from the service server 4 or the sensor 5. The sensor data is data that specifies information detected by the sensor 5, and is exchanged between the service server 4 and the sensor 5. In the example in FIG. 10, the sensor data is binary data.

Also, the data receiving unit 201 sends the received sensor data to the data analysis unit 202. At this time, the data receiving unit 201 also sends, to the data analysis unit 202, identification information that specifies the terminal that has transmitted the sensor data and an identification information type. There are also cases where the data receiving unit 201 receives data other than the sensor data.

The data analysis unit 202 analyzes and converts the sensor data and generates encoded data, based on the sensor data, the identification information, and the identification information type that are sent from the data receiving unit 201, as well as the terminal information, the analysis procedure information, and the user information that are sent from the information receiving unit 205. In the following description, the sensor data and the encoded data thereof are collectively referred to as "data". Note that the identification information for specifying the transmission source terminal and the identification information type may also be added to the data.

In this embodiment, the encoded data is obtained by converting the content of the sensor data so that the sensor data can be handled in the data transfer system 8, and then encoding the converted sensor data. A specific example of the encoded data is data in a format shown in FIG. 11. Although the encoded data in FIG. 11 is expressed so that a person or other systems can recognize the content thereof, the content of the encoded data cannot be recognized by a person or other systems due to encryption, in practice.

Public key cryptography, such as RSA encryption, is an example of the encryption method available in this embodiment, but the encryption method is not limited thereto. To facilitate handling in the data transfer system 8, the encoded data may be given arbitrary data, such as a terminal ID and the date and time of transmission. Conversely, unnecessary data such as a sensor ID may be removed from the encoded data.

The data analysis unit 202 sends, to the browsing authorization providing unit 203, the encoded data, as well as the terminal information and the user information that are sent from the information receiving unit 205. Furthermore, the data analysis unit 202 sends the sensor data based on which the encoded data was obtained, to the data transmission unit 204.

The browsing authorization providing unit 203 sets browsing authorization for the sensor data and determines a transfer destination of the sensor data, based on the terminal information and the user information that are sent from the data analysis unit 202, and the transfer setting information, the browsing setting information, and the group information that are sent from the browsing information receiving unit 206. Also, the browsing authorization providing unit 203 sends, to the data transmission unit 204, the sensor data for which the browsing authorization is set and the transfer destination of the sensor data.

The data transmission unit 204 transmits, to the determined transfer destination, the sensor data that was sent from the data analysis unit 202, and the encoded data that was sent from the browsing authorization providing unit 203.

Configuration of Data Browsing Apparatus

Subsequently, a configuration of the data browsing apparatus 3 according to this embodiment will be described in detail with reference to FIG. 12. FIG. 12 is a block diagram illustrating an example of a configuration of the data browsing apparatus according to the embodiment of the present invention.

As shown in FIG. 12, according to this embodiment, the data browsing apparatus 3 includes a data receiving unit 301, a browsing authorization check unit 302, a data display unit 303, and a browsing authorization receiving unit 304.

The browsing authorization receiving unit 304 receives the transfer setting information, the browsing setting information, and the group information from the management server 1, and sends the received information to the browsing authorization check unit 302. The data receiving unit 301 receives the encoded data transmitted from the data transmission unit 204 in the data transfer apparatus 2, and sends it to the browsing authorization check unit 302.

The browsing authorization check unit 302 checks whether or not a user 7 who uses the data browsing apparatus 3 has the browsing authorization to browse the sensor data, based on the encoded data sent from the data receiving unit 301, and the transfer setting information, the browsing setting information, and the group information sent from the browsing authorization check unit 302. If, as a result of checking, the encoded data includes the browsing authorization that allows the user 7 who is using the data browsing apparatus 3 to browse it, the browsing authorization check unit 302 sends the encoded data to the data display unit 303. On the other hand, if, as a result of checking, the encoded data does not include the browsing authorization that allows the user 7 who uses the data browsing apparatus 3 to browse it, the browsing authorization check unit 302 discards the encoded data without sending it to the data display unit 303.

Upon the encoded data being sent from the browsing authorization check unit 302, the data display unit 303 decodes the sent encoded data, and displays the content of the original sensor data on a screen. Thus, the content of the sensor data is presented to the user 7.

Apparatus Operations

Next, operations of the data transfer system 8 according to the embodiment of the present invention will be described with reference to FIGS. 13 to 17. In this embodiment, a data transfer method is carried out by operating the data transfer system 8. Accordingly, the following description of operations of the data transfer system 8 will substitute a description of the data transfer method according to this embodiment.

Operations of Management Server

Figure 13:
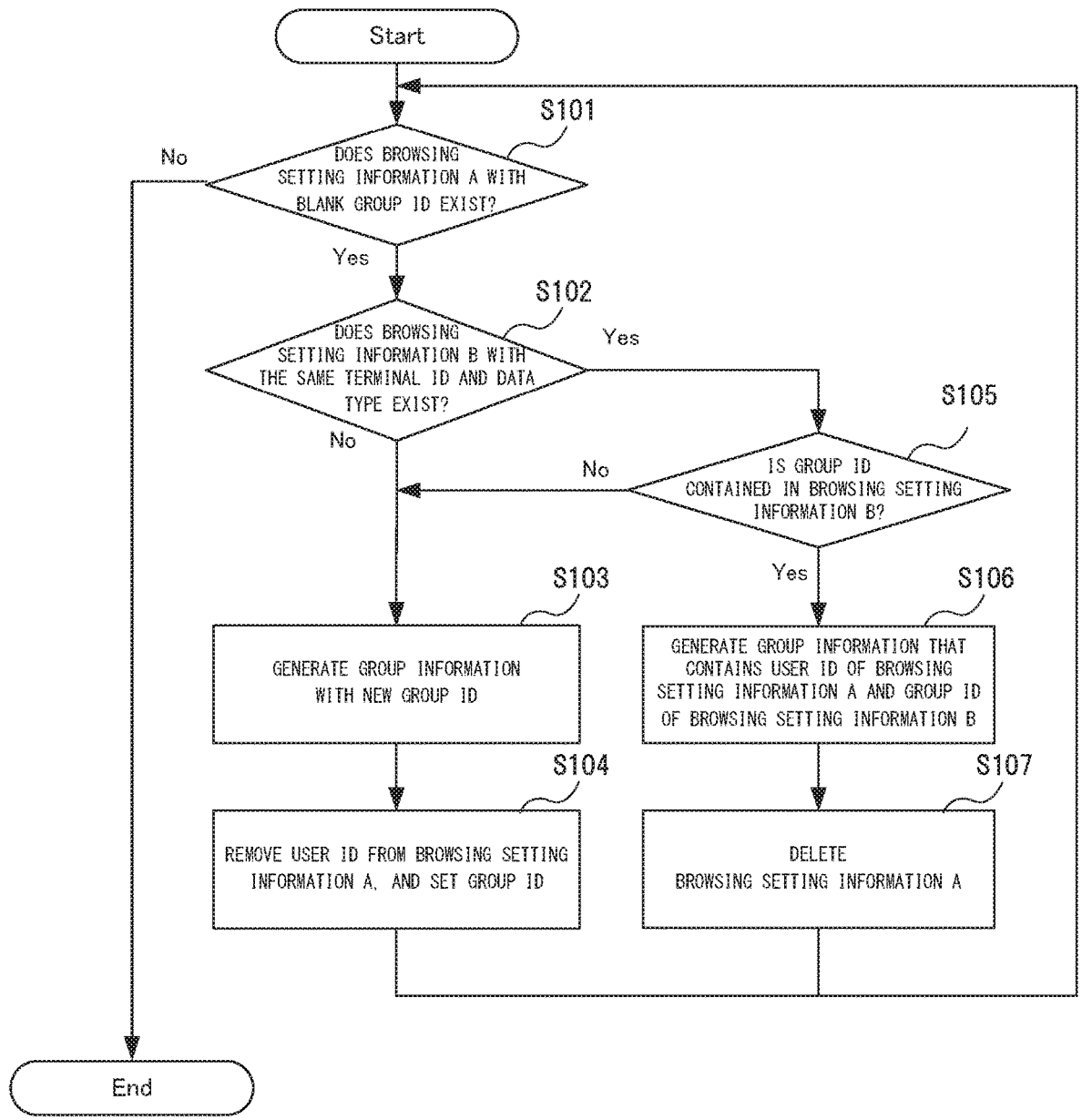
FIG. 13 is a flowchart illustrating operations of the management server according to the embodiment of the present invention.

First, operations of the management server will be described with reference to FIG. 13. In the following description, processing to generate the group information performed by the group information generation unit 111 will mainly be described. FIG. 13 is a flowchart illustrating the operations of the management server according to the embodiment of the present invention.

As shown in FIG. 13, in the management server 1, initially, the group information generation unit 111 determines whether or not any piece of browsing setting information for which no group ID is set (hereinafter, "browsing setting information A") has been accumulated in the browsing setting information accumulation unit 110 (step S101).

If the result of the determination in step S101 indicates that no browsing setting information A has been accumulated (No in step S101), the group information generation unit 111 ends the processing to generate the group information as-is.

On the other hand, if the result of the determination in step S101 indicates that browsing setting information A has been accumulated (Yes in step S101), the group information generation unit 111 determines whether or not browsing setting information (hereinafter, "browsing setting information B") whose terminal ID and data type coincide with those of the browsing setting information A has been accumulated in the browsing setting information accumulation unit 110 (step S102).

If the result of the determination in step S102 indicates that no browsing setting information B has been accumulated (No in step S102), the group information generation unit 111 generates a new, unique group ID. Then, the group information generation unit 111 generates group information that contains this group ID and the user ID that is registered in the browsing setting information A, and accumulates the generated group information in the group information accumulation unit 112 (step S103).

Next, after performing step S103, the group information generation unit 111 removes the user ID from the browsing setting information A, and sets the uniquely assigned new group ID for the browsing setting information A (step S104). After performing step S104, the group information generation unit 111 again performs step S101.

If the result of the determination in step S102 indicates that browsing setting information B has been accumulated (Yes in step S102), the group information generation unit 111 determines whether or not a group ID is contained in the browsing setting information B (step S105).

If the result of the determination in step S105 indicates that a group ID is contained in the browsing setting information B (Yes in step S105), the group information generation unit 111 generates group information that contains the group ID of the browsing setting information A and the group ID of the browsing setting information B (step S106).

Also, the group information generation unit 111 accumulates the generated group information in the group information accumulation unit 112.

Next, after performing step S106, the group information generation unit 111 deletes the browsing setting information A from the browsing setting information accumulation unit 110 (step S107). After performing step S107, the group information generation unit 111 again performs step S101.

If the result of the determination in step S105 indicates that no group ID is contained in the browsing setting information B (No in step S105), the browsing setting information B is subjected to a check when step S101 is performed next. Accordingly, in this case, the group information generation unit 111 performs step S103 described above, and newly generates a unique group ID.

Operations of Data Transfer Apparatus

Figure 14:
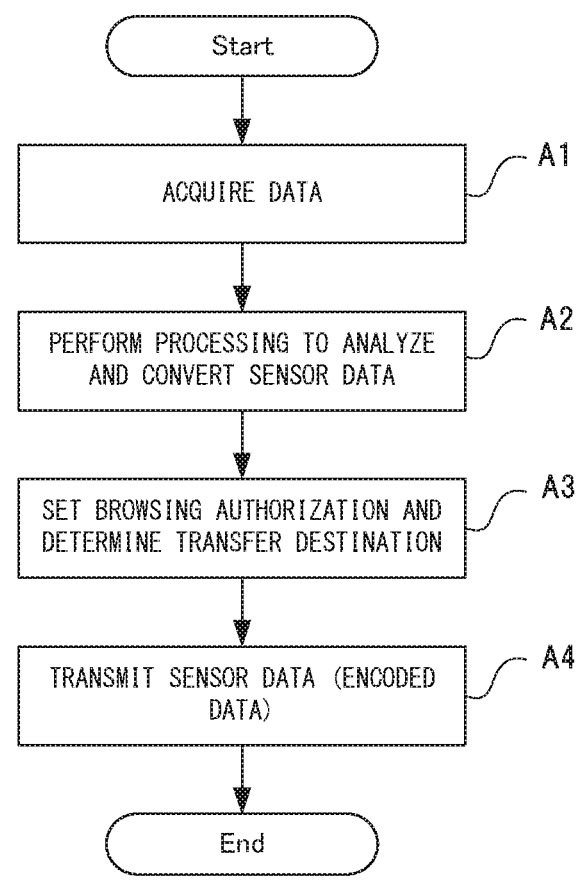
FIG. 14 is a flowchart illustrating operations of the data transfer apparatus according to the embodiment of the present invention.

Subsequently, operations of the data transfer apparatus 2 will be described with reference to FIGS. 14 to 16. First, the overall operations of the data transfer apparatus 2 will be described with reference to FIG. 14. FIG. 14 is a flowchart illustrating operations of the data transfer apparatus according to the embodiment of the present invention.

Firstly, it is presupposed that the information receiving unit 205 has received the terminal information, the analysis procedure information, the user information, and the group information, and has sent the received information to the data analysis unit 202. Also, the browsing information receiving unit 206 has received the transfer setting information, the browsing setting information, and the group information that were transmitted from the management server 1, and has sent the received information to the browsing authorization providing unit 203.

As shown in FIG. 14, initially, the data receiving unit 201 acquires data from the service server 4 or the sensor 5, and sends, to the data analysis unit 202, the acquired data together with the identification information and the identification information type that are provided in the data (step A1).

Next, if the data acquired in step A1 is sensor data, the data analysis unit 202 analyzes and converts the sensor data based on the identification information, the identification information type, the terminal information, the analysis procedure information, the user information, and the group information, and generates encoded data (step A2).

Also, in step A2, the data analysis unit 202 sends the encoded data, the terminal information, the user information, and the group information to the browsing authorization providing unit 203. Furthermore, the data analysis unit 202 sends the sensor data based on which the encoded data was generated, to the data transmission unit 204 to transmit this sensor data to the service server 4.

Next, the browsing authorization providing unit 203 sets browsing authorization for the sensor data and determines a transfer destination of the sensor data, based on the terminal information, the user information, the group information, the transfer setting information, and the browsing setting information (step A3). Also, in step A3, the browsing authorization providing unit 203 sends, to the data transmission unit 204, the sensor data for which the browsing authorization is set and the transfer destination of the sensor data.

Thereafter, the data transmission unit 204 transmits the sensor data or the encoded data to the determined transfer destination (step A4). Transfer of the sensor data is completed by performing steps A1 to A4, and steps A1 to A4 are repeatedly performed every time data is output.

Next, processing to analyze and convert data performed by the data analysis unit 202 in step A2 in FIG. 14 will be described in detail with reference to FIG. 15. FIG. 15 is a flowchart illustrating step A2 in FIG. 14 in detail.

Figure 15:
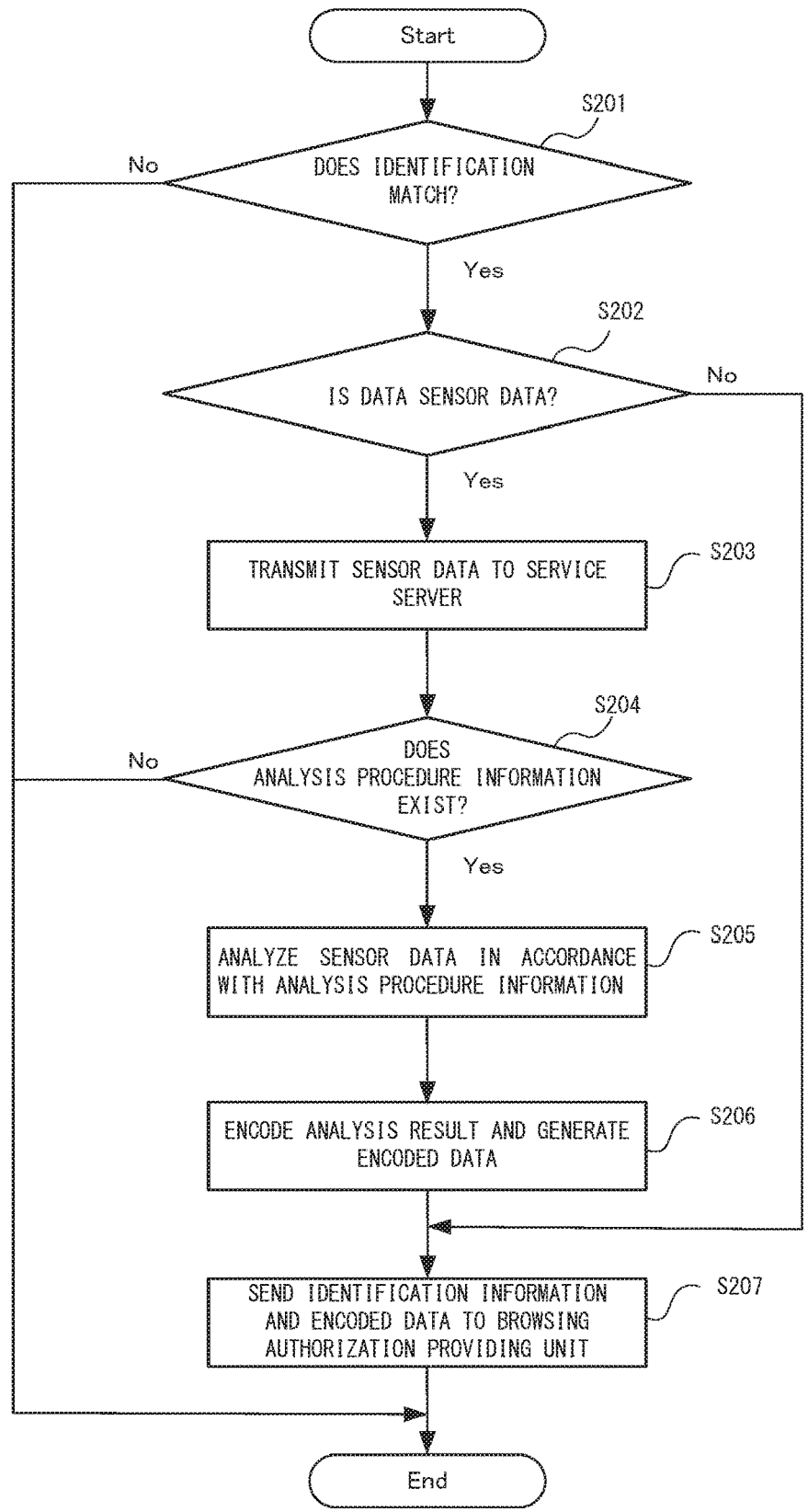
FIG. 15 is a flowchart specifically illustrating step A2 in FIG. 14.

As shown in FIG. 15, initially, the data analysis unit 202 determines whether or not the identification information regarding the sensor 5 coincides with information registered as the terminal information (step S201). If the result of the determination in step S201 indicates that the identification information does not coincide with the information registered as the terminal information (No in step S201), the data analysis unit 202 ends the processing to analyze and convert data as-is.

On the other hand, if the result of the determination in step S201 indicates that the identification information coincides with the information registered as the terminal information (Yes in step S201), the data analysis unit 202 determines whether or not the transmitted data is sensor data (step S202).

If the result of the determination in step S202 indicates that the transmitted data is not sensor data (No in step S202), e.g. if the transmitted data is encoded data, the data analysis unit 202 performs step S207, which will be described later.

On the other hand, if the result of the determination in step S202 indicates that the transmitted data is sensor data (Yes in step S202), the data is sensor data that was output from the sensor 5. Accordingly, to enable a service that is already run to continue as-is, the data analysis unit 202 transmits the sensor data to the service server 4 via the data transmission unit 204 (step S203).

Next, after performing step S203, the data analysis unit 202 determines whether or not analysis procedure information exists (step S204). If the result of the determination in step S204 indicates that no analysis procedure information exists (No in step S204), the data analysis unit 202 ends the processing to analyze and convert data as-is.

On the other hand, if the result of the determination in step S204 indicates that analysis procedure information exists (Yes in step S204), the data analysis unit 202 analyzes the sensor data in accordance with the analysis procedure information (step S205).

Next, after performing step S205, the data analysis unit 202 performs encoding processing on the analyzed sensor data to generate encoded data (step S206).

Thereafter, the data analysis unit 202 sends the identification information and encoded data to the browsing authorization providing unit 203 (step S207). Thus, step A2 ends.

Next, a detailed description will be given, with reference to FIG. 16, of the processing to set browsing authorization and the processing to determine a transfer destination of the sensor data performed by the browsing authorization providing unit 203 in step A3 in FIG. 14. FIG. 16 is a flowchart illustrating step A3 in FIG. 14 in detail.

Figure 16:
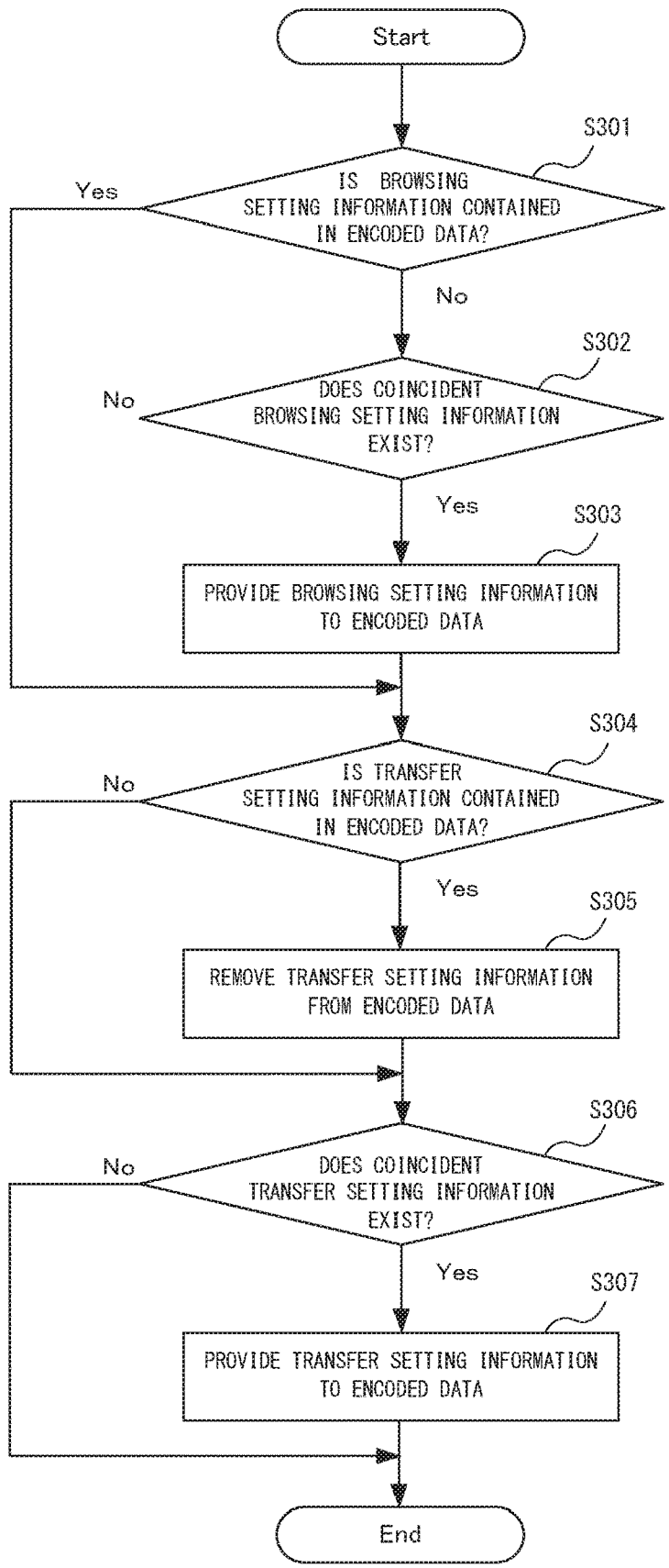
FIG. 16 is a flowchart specifically illustrating step A3 in FIG. 14.

As shown in FIG. 16, initially, the browsing authorization providing unit 203 determines whether or not browsing setting information is contained in the encoded data that was sent from the data analysis unit 202 (step S301).

If the result of the determination in step S301 indicates that browsing setting information is contained (Yes in step S301), the browsing authorization providing unit 203 does not need to newly provide browsing authorization, and accordingly performs step S304, which will be described later.

On the other hand, if the result of the determination in step S301 indicates that no browsing setting information is contained (No in step S301), the browsing authorization providing unit 203 specifies a terminal ID that corresponds to the identification information that is provided in the encoded data. Then, the browsing authorization providing unit 203 determines whether or not browsing setting information exists in which the transmission source terminal ID is the specified terminal ID (step S302).

If the result of the determination in step S302 indicates that no such browsing setting information exists (No in step S302), the browsing authorization providing unit 203 cannot set browsing authorization for the encoded data, and accordingly performs step S304, which will be described later.

On the other hand, if the result of the determination in step S302 indicates that such browsing setting information exists (Yes in step S302), the browsing authorization providing unit 203 sets browsing authorization for the encoded data (step S303). Specifically, the browsing authorization providing unit 203 sets browsing authorization by providing this browsing setting information to the encoded data.

Next, the browsing authorization providing unit 203 determines whether or not transfer setting information is contained in the encoded data (step S304).

If the result of the determination in step S304 indicates that no transfer setting information is contained (No in step S304), the browsing authorization providing unit 203 performs step S306.

On the other hand, if the result of the determination in step S304 indicates that transfer setting information is contained (Yes in step S304), the browsing authorization providing unit 203 removes the transfer setting information contained in the encoded data to set a new transfer destination (step S305).

Next, the browsing authorization providing unit 203 determines whether or not transfer setting information exists in which the transfer source is the terminal ID specified from the identification information (step S306).

If the result of the determination in step S306 indicates that such transfer setting information exists (Yes in step S306), the browsing authorization providing unit 203 provides the transfer setting information to the encoded data (S307). Thus, the transfer destination of the encoded data is determined.

On the other hand, if the result of the determination in step S306 indicates that no such transfer setting information exists (No in step S306), the browsing authorization providing unit 203 cannot provide transfer setting information to the encoded data, and accordingly the processing ends as-is.

After finishing steps S301 to S307 described above, the browsing authorization providing unit 203 sends, to the data transmission unit 204, the encoded data in which the browsing setting information and transfer setting information are provided. Thus, the data transmission unit 204 performs step A4, and transmits the encoded data to the transfer destination in accordance with the transfer setting information that is provided in the encoded data.

Operations of Data Browsing Apparatus

Figure 17:
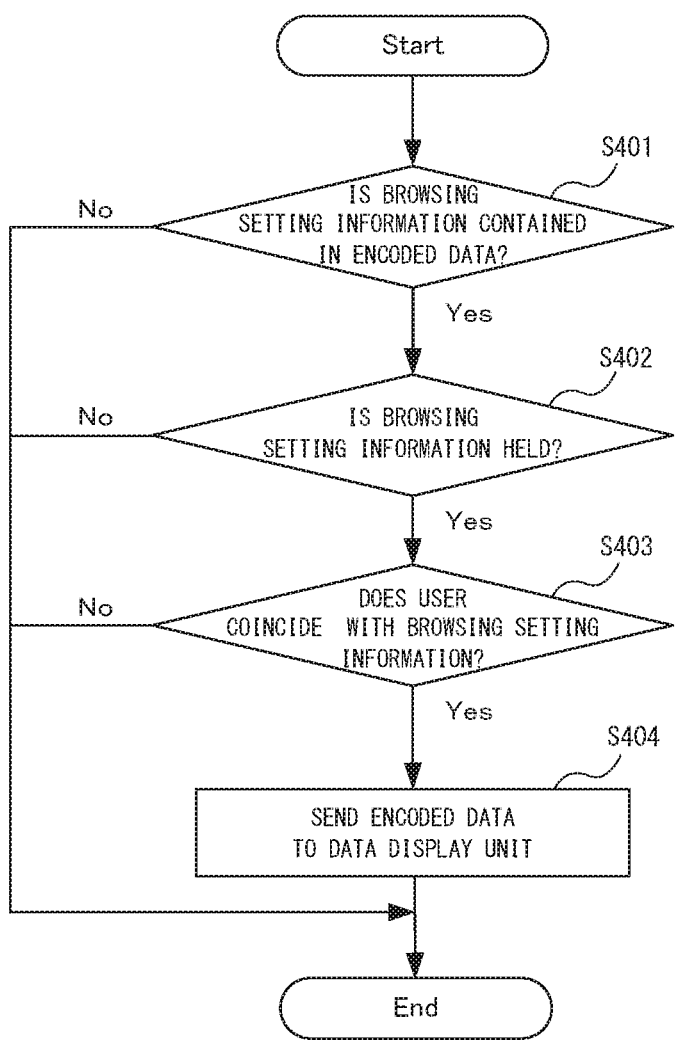
FIG. 17 is a flowchart illustrating operations of the data browsing apparatus according to the embodiment of the present invention.

Subsequently, operations of the data browsing apparatus 3 will be described with reference to FIG. 17. FIG. 17 is a flowchart illustrating operations of the data browsing apparatus according to the embodiment of the present invention.

Firstly, it is presupposed that the browsing authorization receiving unit 304 has received the transfer setting information, the browsing setting information, and the group information from the management server 1, and has sent the received information to the browsing authorization check unit 302. The data receiving unit 301 has received the encoded data transmitted from the data transmission unit 204 in the data transfer apparatus 2 and sent it to the browsing authorization check unit 302.

As shown in FIG. 17, initially, the browsing authorization check unit 302 checks whether or not browsing setting information is contained in the encoded data sent from the data receiving unit 301 (step S401).

If the result of the determination in step S401 indicates that no browsing setting information is contained (No in step S401), the browsing authorization check unit 302 does not have the authorization to browse this encoded data, and accordingly ends the processing.

On the other hand, if the result of the determination in step S401 indicates that browsing setting information is contained (Yes in step S401), the browsing authorization check unit 302 determines whether or not the data browsing apparatus 3 has the browsing setting information contained in the encoded data (step S402).

If the result of the determination in step S402 indicates that the data browsing apparatus 3 does not have the browsing setting information (No in step S402), the browsing authorization check unit 302 also does not have the authorization to browse this encoded data in this case, and accordingly ends the processing.

On the other hand, if the result of the determination in step S402 indicates that the data browsing apparatus 3 has the browsing setting information (Yes in step S402), the browsing authorization check unit 302 determines whether or not the user 7 who is using the data browsing apparatus 3 has the browsing authorization, based on the browsing setting information that is provided in the encoded data (step S403). Specifically, the browsing authorization check unit 302 determines whether or not the user ID of this user 7 or the group ID of the group to which this user belongs is registered in the browsing setting information.

If the result of the determination in step S403 indicates that the user 7 who is using the data browsing apparatus 3 does not have the browsing authorization (No in step S403), the browsing authorization check unit 302 ends the processing.

On the other hand, if the result of the determination in step S403 indicates that the user 7 who is using the data browsing apparatus 3 has the browsing authorization (Yes in step S403), the browsing authorization check unit 302 sends the encoded data to the data display unit 303 (step S404).

As a result of performing step S404, the data display unit 303 decodes the encoded data sent from the browsing authorization check unit 302, and displays the content of the decoded sensor data on a screen. Thus, the content of the sensor data is presented to the user 7. If the user does not have the browsing authorization, the encoded data is not sent to the data display unit 303, and thus, the user cannot browse the content of the sensor data.

Effects of Embodiment

As described above, according to this embodiment, the safety in the exchanging of sensor data can be ensured while suppressing an increase in the amount of transferred data in a case of sharing the sensor data between services that use the sensor 5.

In this embodiment, the management server 1 includes the group information generation unit 111. If the administrator adds browsing authorization for a plurality of users who use a service, a group to which the plurality of users belong is generated. Thus, according to this embodiment, browsing authorization can be provided for data based on group information. Also, in this case, browsing authorization for a single group need only be provided for sensor data. Accordingly, the increase in data size in a case where the number of users is increased can be kept at a minimum.

Program

A first program according to this embodiment may be a program for causing a computer to perform steps S101 to S107 in FIG. 13. By installing this program in the computer and executing it, the management server 1 according to this embodiment can be realized. In this case, a CPU (Central Processing Unit) of the computer functions as each unit in the management server 1 and performs processing.

A second program according to this embodiment may be a program for causing a computer to perform steps A1 to A4 in FIG. 14. By installing this program in the computer and executing it, the data transfer apparatus 2 according to this embodiment can be realized. In this case, a CPU (Central Processing Unit) of the computer functions as each unit in the data transfer apparatus 2 and performs processing.

A third program according to this embodiment may be a program for causing a computer to perform steps S401 to S404 in FIG. 17. By installing this program in the computer and executing it, the data browsing apparatus 3 according to this embodiment can be realized. In this case, a CPU (Central Processing Unit) of the computer functions as each unit in the data browsing apparatus 3 and performs processing.

Each of the first to third programs may also be executed by a computer system that is constituted by a plurality of computers.

Figure 18:
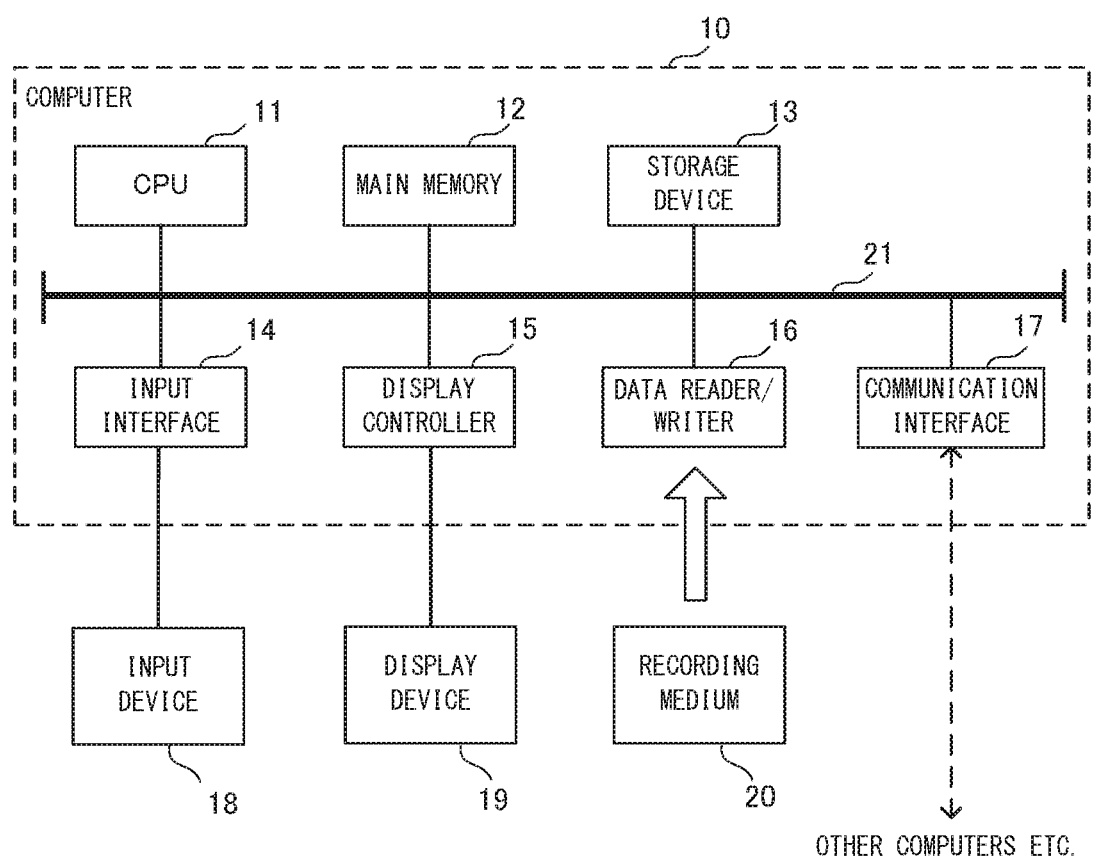
FIG. 18 is a block diagram illustrating an example of a computer capable of realizing the apparatuses that constitute the data transfer system according to the embodiment of the present invention.

A description will now be given, with reference to FIG. 18, of a computer that realizes the management server 1, the data transfer apparatus 2, or the data browsing apparatus 3 by executing any of the first to third programs according to this embodiment. FIG. 18 is a block diagram illustrating an example of a computer capable of realizing an apparatus that constitutes the data transfer system according to the embodiment of the present invention.

As shown in FIG. 18, a computer 10 includes a CPU 11, a main memory 12, a storage device 13, an input interface 14, a display controller 15, a data reader/writer 16, and a communication interface 17. These units are connected to each other via a bus 21 so as to be able to communicate data.

The CPU 11 loads the programs (codes) according to this embodiment that are stored in the storage device 13 to the main memory 12, and executes these programs in a predetermined order, thereby performing various kinds of computation. The main memory 12 is typically a volatile storage device, such as a DRAM (Dynamic Random Access Memory). The programs according to this embodiment are provided in a state of being stored in a computer-readable recording medium 20. Note that the programs according to this embodiment may also be distributed on the Internet to which the computer 10 is connected via the communication interface 17.

Specific examples of the storage device 13 include a hard disk drive, as well as a semiconductor storage device such as a flash memory. The input interface 14 mediates data transmission between the CPU 11 and an input device 18, such as a keyboard or a mouse. The display controller 15 is connected to a display device 19, and controls display on the display device 19.

The data reader/writer 16 mediates data transmission between the CPU 11 and the recording medium 20, reads out the programs from the recording medium 20, and writes the results of processing performed by the computer 10 in the recording medium 20. The communication interface 17 mediates data transmission between the CPU 11 and other computers.

Specific examples of the recording medium 20 include a general-purpose semiconductor storage device such as a CF (Compact Flash (registered trademark)) or a SD (Secure Digital), a magnetic recording medium such as a Flexible Disk, and an optical storage medium such as a CD-ROM (Compact Disk Read Only Memory).

Example 1

Subsequently, a more detailed description will be given, with reference to FIGS. 19 to 30, of basic configurations and basic operations according to the above-described embodiment in examples of the data transfer system according to this embodiment, using specific values.

System Configuration

Figure 19:
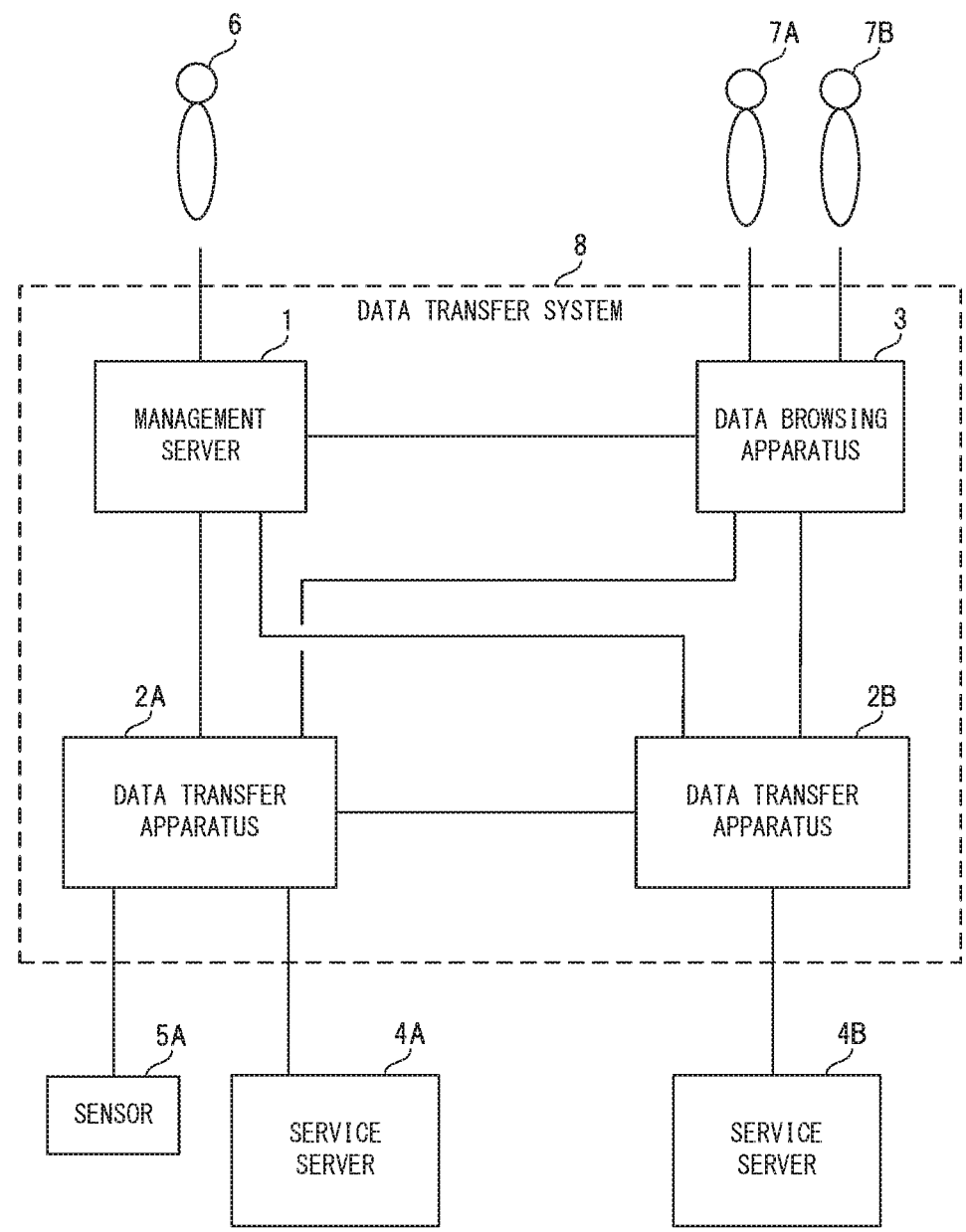
FIG. 19 is a block diagram illustrating a configuration of the data transfer system in Example 1 of the present invention.

FIG. 19 is a block diagram illustrating a configuration of a data transfer system in Example 1 of the present invention. As shown in FIG. 19, in Example 1, the data transfer system 8 includes one management server 1, two data transfer apparatuses 2A and 2B, and a data browsing apparatus 3. A sensor 5A and a service server 4A are connected to the data transfer apparatus 2A. The data transfer apparatus 2B is connected to the service server 4B.

In Example 1, sensor data that is output from the sensor 5A is transferred to the service server 4B, and the content of the sensor data is browsed by users 7A and 7B via the data browsing apparatus 3. The sensor data output from the sensor 5A is data that specifies temperature.

First, a system administrator 6 registers, as the terminal information, terminal information regarding the service servers 4A and 4B, the sensor 5A, the data transfer apparatuses 2A and 2B, and the data browsing apparatus 3, to the management server 1. FIG. 20 shows the terminal information that is accumulated in the terminal information accumulation unit 102. As shown in FIG. 20, the terminal information regarding the service servers 4A and 4B, the sensor 5A, the data transfer apparatuses 2A and 2B, and the data browsing apparatus 3 is accumulated in the terminal information accumulation unit 102, and IP addresses or MAC addresses thereof are registered as the identification information.

Next, the system administrator 6 registers analysis procedure information to the management server 1. FIG. 21 shows the analysis procedure information accumulated in the analysis procedure information accumulation unit 104. According to FIG. 21, the first to sixth bytes of the sensor data output from the sensor 5A indicate an MAC address, the seventh to tenth bytes indicate time, and the eleventh byte indicates temperature.

Next, the system administrator 6 registers user information to the management server 1. FIG. 22 shows the user information that is accumulated in the user information accumulation unit 106. According to FIG. 22, the user 7A and the user 7B are assigned an ID "U001" and an ID "U002", respectively.

Next, the system administrator 6 registers transfer setting information to the management server 1. FIG. 23 shows the transfer setting information that is accumulated in the transfer setting information accumulation unit 108. According to FIG. 23, settings to transfer the sensor data (temperature) from the data transfer apparatus 2A to the data transfer apparatus 2B, from the data transfer apparatus 2A to the data browsing apparatus 3, and from the data transfer apparatus 2B to the data browsing apparatus 3, are accumulated in the transfer setting information accumulation unit 108.

Next, the system administrator 6 registers browsing setting information to the management server 1. FIG. 24 shows browsing setting information that is accumulated in the browsing setting information accumulation unit 110. According to FIG. 24, a setting for the user 7A to browse the temperature obtained by the sensor 5A and a setting for the user 7B to browse the temperature obtained by the sensor 5A are accumulated in the browsing setting information accumulation unit 110.

As described above, in Example 1, initially, the system administrator 6 registers various kinds of information to the management server 1. Thereafter, the following processing is performed.

Operations of Management Server

Next, processing to generate group information performed by the group information generation unit 111 will be described according to the steps in FIG. 13, with reference to FIG. 25. FIG. 25 illustrates changes in the content of a browsing setting information accumulation unit and the content of a group information accumulation unit in Example 1 of the present invention, and FIGS. 25(a) to 25(c) illustrate the process of a series of changes. A description will be given below of a procedure in a case where group information is generated based on the content of the browsing setting information accumulation unit 110 and the content of the group information accumulation unit 112 shown in FIG. 25(a).

First, the group information generation unit 111 determines whether or not browsing setting information A for which no group ID is set has been accumulated in the browsing setting information accumulation unit 110 (step S101). Specifically, as shown in FIG. 25(a), browsing setting information has been accumulated in which only a terminal ID "D103", a browsable data type "temperature", and the ID "U001" of the user who can browse data are registered, and no group ID is set. Accordingly, since browsing setting information A has been accumulated in the browsing setting information accumulation unit 110, the result of the determination in step S101 is "Yes", and step S102 is performed.

Next, the group information generation unit 111 determines whether or not browsing setting information B that contains the same terminal ID and browsable data type as those of the browsing setting information A has been accumulated in the browsing setting information accumulation unit 110 (step S102). Since another browsing setting information in which the terminal ID "D103", the browsable data type "temperature", and the user ID "U002" are registered is also accumulated as shown in FIG. 25(*a*), the result of the determination in step S102 is "Yes", and step S105 is performed.

Next, the group information generation unit 111 determines whether or not a group ID is contained in the browsing setting information B (step S105). In the example in FIG. 25(*a*), no group ID is contained in the browsing setting information B, and accordingly, the result of the determination in step S105 is "No". Accordingly, the browsing setting information B is subjected to a check when step S101 is performed next. Also, in this case, step S103 is performed subsequently.

Next, the group information generation unit 111 generates a new, unique group ID, and accumulates group information that contains the generated group ID and the user ID of the browsing setting information A, in the group information accumulation unit 112 (step S103). Furthermore, the group information generation unit 111 removes the user ID from the browsing setting information A, and sets the uniquely assigned new group ID for the browsing setting information A (S104). Specifically, G001 is generated as the new, unique group ID, and the result of performing processing in steps S103 and S104 is as shown in FIG. 25(*b*).

It is assumed that the group information generation unit 111 performs processing in step S101 when the browsing setting information is in a state shown in FIG. 25(*b*). In this case as well, browsing setting information A in which only the terminal ID "D103", the browsable data type "temperature", and the ID "U002" of the user who can browse data are registered, is accumulated in the browsing setting information accumulation unit 110. Accordingly, the result of the determination in step S101 is "Yes", and step S102 is performed.

In this case, browsing setting information B that contains the terminal ID "D103", the browsable data type "temperature", and the group ID "G001" is already accumulated. Accordingly, in this case as well, the result of the determination in step S102 is "Yes", and step S105 is performed.

Next, the group information generation unit 111 performs step S105. Here, since the group ID is contained in the browsing setting information B, the result of the determination in step S105 is "Yes", and step S106 is performed, unlike the aforementioned case.

Next, the group information generation unit 111 generates group information that contains the user ID of the browsing setting information A and the group ID of the browsing setting information B, and accumulates the generated group information in the group information generation unit 112 (step S106). Furthermore, the group information generation unit 111 deletes the browsing setting information A from the browsing setting information accumulation unit 110 (step S107). After performing step S107, the group information generation unit 111 again performs step S101.

As a result of step S107 being performed, group information that contains the user ID "U001" of the browsing setting information A and the group ID of the browsing setting information B is generated. Then, the browsing setting information A is deleted from the browsing setting information accumulation unit 110, as shown in FIG. 25(*c*).

Also, it is assumed that the group information generation unit 111 performs processing in step S101 when the browsing setting information is in a state shown in FIG. 25(*c*). In this case, since no browsing setting information A for which no group ID is set exists, the result of the determination in step S101 is "No", and the processing to generate group information ends.

As a result of the above processing, a series of processing in the management server is complete. Thereafter, various kinds of accumulated information is transmitted to the data transfer apparatus 2A, the data transfer apparatus 2B, and the data browsing apparatus 3 via either the information transmission unit 113 or the browsing authorization transmission unit 114.

Operations of Data Transfer Apparatus A

Figure 26:
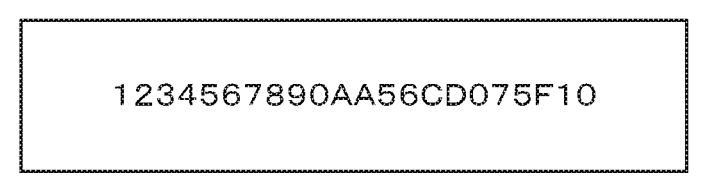

Next, processing to analyze and convert data performed by the data analysis unit 202 in the data transfer apparatus 2A will be described according to the steps in FIG. 15. In the following description, it is assumed that the sensor 5A has transmitted sensor data shown in FIG. 26 to the data transfer apparatus 2A. FIG. 26 shows the sensor data that is output in Example 1 of the present invention.

Initially, the data analysis unit 202 determines whether or not terminal information exists in which a MAC address "12-34-56-78-90-AA", which is identification information regarding the sensor 5A, is registered (step S201). As shown in FIG. 20, in Example 1, the terminal information regarding the sensor 5A is accumulated in the terminal information accumulation unit 102. Accordingly, the result of the determination in step S201 is "Yes", and step S202 is performed.

Next, the data analysis unit 202 determines whether or not the transmitted data is sensor data (step S202). Here, the data transmitted from the sensor 5A is sensor data. Accordingly, the result of the determination in step S202 is "Yes", and the data analysis unit 202 transmits the sensor data transmitted from the sensor 5A to the service server 4A (step S203).

Next, the data analysis unit 202 determines whether or not analysis procedure information is registered (step S204). Here, analysis procedure information regarding the sensor 5A is registered, as shown in FIG. 21. Accordingly, the result of the determination in step S204 is "Yes", and the data analysis unit 202 analyzes the sensor data in accordance with the analysis procedure information (step S205).

According to the analysis procedure information, the first to sixth bytes indicate a MAC address, the seventh to tenth bytes indicate time, and the eleventh byte indicates temperature. Accordingly, if the sensor data is that shown in FIG. 26, an MAC address "12-34-56-78-90-AA", time "10:29:03, Feb. 24, 2016", and temperature "16° C." are obtained as analysis results.

Next, the data analysis unit 202 encodes the analysis results to generate encoded data (step S206). Also, the data analysis unit 202 provides the encoded data with a data type "temperature", which is obtained from the analysis results, and generates encoded data that has the content shown in FIG. 27. Note that the actual encoded data is binary data. FIG. 27 illustrates the encoded data generated in Example 1 of the present invention.

Thereafter, the data analysis unit 202 sends the identification information and the encoded data to the browsing authorization providing unit 203 (step S207). The processing to analyze and convert data performed by the data analysis unit 202 in the data transfer apparatus 2A is as described above.

Next, a description will be given of processing to set browsing authorization and processing to determine a transfer destination performed by the browsing authorization providing unit 203 in the data transfer apparatus 2A according to the steps shown in FIG. 16.

Initially, the browsing authorization providing unit 203 determines whether or not browsing setting information is contained in the encoded data sent from the data analysis unit 202 (step S301). As shown in FIG. 27, the encoded data does not contain browsing setting information, and accordingly, the result of the determination in step S301 is "No".

Subsequently, the browsing authorization providing unit 203 specifies a terminal ID that corresponds to the identification information that is provided in the encoded data, and determines whether or not browsing setting information exists in which the transmission source terminal ID is the specified terminal ID (step S302). Here, as shown in FIG. 25(c), browsing setting information exists in which a transmission source terminal ID "D103" and a browsable data type "temperature" are registered. Accordingly, the result of the determination in step S302 is "Yes".

Next, the browsing authorization providing unit 203 provides the encoded data with the browsing setting information, as the browsing authorization, in which the transmission source terminal ID is the specified terminal ID (step S303). Specifically, the browsing authorization providing unit 203 provides the content of the encoded data shown in FIG. 27 with the browsing setting information indicating that the group ID "G001" can browse the content of the encoded data, and generates data in a format shown in FIG. 28. FIG. 28 shows the encoded data in which the browsing setting information is provided in Example 1 of the present invention.

Next, the browsing authorization providing unit 203 determines whether or not transfer setting information is contained in the encoded data (step S304). In the example in FIG. 28, the encoded data does not contain transfer setting information, and accordingly, the result of the determination in step S304 is "No".

Next, the browsing authorization providing unit 203 determines whether or not transfer setting information exists in which the transmission source (transfer source) terminal ID is the specified terminal ID (step S306). In Example 1, as shown in FIG. 23, transfer setting information exists in which "D102", which indicates the data transfer apparatus 2A, is registered as the transfer source terminal ID, and "temperature" is registered as the data type. Accordingly, the result of the determination in step S306 is "Yes".

Next, the browsing authorization providing unit 203 provides transfer setting information to the encoded data (step S307). Specifically, the browsing authorization providing unit 203 provides the content of the encoded data shown in FIG. 28 with transfer setting information indicating a transfer destination terminal ID "D202" and a transfer terminal ID "D001", and generates data in a format shown in FIG. 29. FIG. 29 shows the encoded data in which the transfer setting information is provided in Example 1 of the present invention.

The processing to set browsing authorization and the processing to determine a data transfer destination performed by the browsing authorization providing unit 203 in the data transfer apparatus 2A are as described above.

Thereafter, the browsing authorization providing unit 203 sends the encoded data in which the browsing setting information and the transfer setting information are provided, to the data transmission unit 204. Thus, the data transmission unit 204 transmits the encoded data to the transfer destination in accordance with the transfer setting information provided in the encoded data that was sent from the browsing authorization providing unit 203. Here, as shown in FIG. 29, the data transfer apparatus 2B, which corresponds to the terminal ID "D202", and the data browsing apparatus 3, which corresponds to the terminal ID "D001", are set as transfer destinations of the encoded data. For this reason, the encoded data is transferred to the data transfer apparatus 2B and the data browsing apparatus 3.

Operations of Data Transfer Apparatus B

Next, processing to analyze and convert data performed by the data analysis unit 202 in the data transfer apparatus 2B will be described according to the steps in FIG. 15. In the following description, the encoded data transferred from the data transfer apparatus 2A is data that has a format shown in FIG. 29.

Initially, the data analysis unit 202 determines whether or not terminal information exists in which an IP address "192.168.1.2", which is identification information regarding the data transfer apparatus 2A, is registered (step S201). As shown in FIG. 20, in Example 1, the terminal information regarding the data transfer apparatus 2A is accumulated in the terminal information accumulation unit 102. Accordingly, the result of the determination in step S201 is "Yes", and step S202 is performed.

Next, the data analysis unit 202 determines whether or not the transmitted data is sensor data (step S202). Here, the data transferred from the data transfer apparatus 2A is encoded data. Accordingly, the result of the determination in step S202 is "No", and step S207 is performed.

Next, the data analysis unit 202 sends the identification information and the encoded data to the browsing authorization providing unit 203 (step S207). The processing to analyze and convert data performed by the data analysis unit 202 in the data transfer apparatus 2B is as described above.

Next, a description will be given of processing to set browsing authorization and processing to determine a transfer destination performed by the browsing authorization providing unit 203 in the data transfer apparatus 2B according to the steps shown in FIG. 16.

Initially, the browsing authorization providing unit 203 determines whether or not browsing setting information is contained in the encoded data that is transmitted from the data analysis unit 202 (step S301). Since the browsing setting information is contained in the encoded data as shown in FIG. 29, the result of the determination in step S301 is "Yes", and thus, step S304 is performed.

Next, the browsing authorization providing unit 203 determines whether or not transfer setting information is contained in the encoded data (step S304). In the example in FIG. 29, transfer setting information is contained in the encoded data, and accordingly the result of step S304 is "Yes".

Accordingly, the browsing authorization providing unit 203 removes the transfer setting information contained in the encoded data in order to set a new transfer destination (step S305). In Example 1, the browsing authorization providing unit 203 removes the transfer destination terminal ID "D202" and the transfer destination terminal ID "D001", which are contained as the transfer setting information, from the content of the encoded data shown in FIG. 29. Then, the browsing authorization providing unit 203 generates data in a format shown in FIG. 28.

Next, the browsing authorization providing unit 203 specifies a terminal ID that corresponds to the identification information provided in the encoded data, and determines whether or not transfer setting information exists in which the specified terminal ID is set as a transmission source (transfer source) terminal ID (step S306). In Example 1, transfer setting information exists in which "D202", which indicates the data transfer apparatus 2B, is registered as the transfer source terminal ID, and "temperature" is registered as a data type, as shown in FIG. 23. Accordingly, the result of the determination in step S306 is "Yes".

Next, the browsing authorization providing unit 203 provides transfer setting information to the encoded data (step S307). Specifically, the browsing authorization providing unit 203 provides transfer setting information that indicates the transfer destination terminal ID "D001" to the content of the encoded data shown in FIG. 28, and generates data in a format shown in FIG. 30. FIG. 30 shows the encoded data in which the transfer setting information is provided in Example 1 of the present invention.

The processing to set browsing authorization and the processing to determine a data transfer destination performed by the browsing authorization providing unit 203 in the data transfer apparatus 2B are as described above.

Thereafter, the browsing authorization providing unit 203 sends the encoded data in which the browsing setting information and the transfer setting information are provided, to the data transmission unit 204. Thus, the data transmission unit 204 transmits the encoded data to the transfer destination in accordance with the transfer setting information provided in the encoded data that was sent from the browsing authorization providing unit 203. Here, in the encoded data, the data browsing apparatus 3 whose terminal ID is "D001" is set as the transfer destination, as shown in FIG. 30. For this reason, the encoded data is transferred to the data browsing apparatus 3.

Operations of Data Browsing Apparatus

Next, a description will be given of processing performed in a case where the data browsing apparatus 3 has received the encoded data, and the browsing authorization check unit 302 checks the browsing authorization, according to the steps shown in FIG. 17. In the following description, it is assumed that the encoded data that has the content shown in FIG. 29 has been transferred from the data transfer apparatus 2A, and the encoded data that has the content shown in FIG. 30 has been transferred from the data transfer apparatus 2B, as described above. Also, in the following description, it is assumed that the user 7A uses the data browsing apparatus 3.

Initially, the browsing authorization check unit 302 determines whether or not browsing setting information is contained in the encoded data sent from the data receiving unit 301 (step S401). Here, an ID "G001" of the group that can browse data is contained as the browsing setting information in both the encoded data shown in FIG. 29 and the encoded data shown in FIG. 30. Accordingly, the result of the determination in step S401 is "Yes", and thus, step S402 is performed.

Next, the browsing authorization check unit 302 checks whether or not the data browsing apparatus 3 holds the browsing setting information contained in the encoded data (step S402). Here, since the data browsing apparatus 3 holds the browsing setting information shown in FIG. 25(c), the result of the determination in step S402 is "Yes", and thus, step S403 is performed.

Next, the browsing authorization check unit 302 determines whether or not the user 7A who is using the data browsing apparatus 3 has browsing authorization (step S403). In Example 1, the group ID "G001" is contained as the browsing setting information in both the encoded data shown in FIG. 29 and the encoded data shown in FIG. 30. Also, the group ID "G001" includes the user ID "U001", which indicates the user 7A, as shown in FIG. 25(c). Accordingly, the user 7A who is using the data browsing apparatus 3 coincides with the browsing setting information, and has browsing authorization. Accordingly, the result of the determination in step S403 is "Yes", and step S404 is performed.

Next, the browsing authorization check unit 302 sends the encoded data to the data display unit 303 (step S404). The processing performed in a case where the browsing authorization check unit 302 checks the browsing authorization is as described above.

As a result, the data display unit 303 decodes the encoded data sent from the browsing authorization check unit 302 and presents it to the user 7A. Similarly, in a case where the user B is using the data browsing apparatus 3 as well, the group ID "G001" includes the user ID "U002" that indicates the user 7B, and accordingly, the result of the determination in step S403 is "Yes", and the encoded data is sent to the data display unit 303. However, if a user other than the user 7A and the user 7B is using the data browsing apparatus 3, the result of the determination in step S403 is "No", and thus, the encoded data is not sent to the data display unit 303. In this case, no user can browse the data, and thus, the safety of the data is ensured.

Although the present invention has been described above using a preferable embodiment and examples, the present invention is not necessarily limited to the above embodiment and examples, and may be modified in various manners within the scope of the technical scope of the invention. In addition, the above-described apparatus configurations and flowcharts are examples, and may be changed or modified in any way.

Part of, or the entire embodiment described above can be expressed by the followings Supplementary Note 1 to Supplementary Note 20, but is not limited thereto.

(Supplementary Note 1)

A data transfer system for sharing, between a plurality of services, data output from a sensor capable of being used in the services, the system including:

a management server for managing user information that specifies users who use the services, browsing setting information that defines, for each type of the data, a user who can browse content of the data, and transfer setting information designates a transfer destination of the data;

a data transfer apparatus for acquiring the user information, the browsing setting information, and the transfer setting information from the management server, setting, for the data, browsing authorization that allows only a specific user to browse the content of the data, based on the user information and the browsing setting information, and transferring the data for which the browsing authorization is set to the designated transfer destination, based on the transfer setting information; and a data browsing apparatus for determining, upon receiving the data for which the browsing authorization is set, whether or not a specific user has the browsing authorization that is set for the received data, based on the user information, the browsing setting information, and the transfer setting information acquired from the management server, and presenting content of the received data to the specific user if the specific user has the browsing authorization.

(Supplementary Note 2)

The data transfer system according to Supplementary Note 1,
wherein the sensor continuously outputs the data at set intervals,
the data transfer apparatus sets the browsing authorization for each piece of the data that is continuously output, and
the data browsing apparatus determines whether or not a specific user has the browsing authorization, for each piece of the data that is continuously output.

(Supplementary Note 3)
The data transfer system according to Supplementary Note 1 or 2,
wherein the management server sets a group of users who have the same browsable data type, based on the user information and the browsing setting information, creates group information that specifies the set group, and defines, in the browsing setting information, a group that can browse the content of the data, for each type of the data, and
the data transfer apparatus acquires the group information from the management server, and sets, for the data, browsing authorization that allows only a specific group to browse the content of the data, based on the group information and the browsing setting information.

(Supplementary Note 4)
The data transfer system according to any one of Supplementary Notes 1 to 3,
wherein the data transfer apparatus encodes the data, sets the browsing authorization to the encoded data, and transmits, to the transfer destination, the encoded data for which the browsing authorization is set.

(Supplementary Note 5)
The data transfer system according to any one of Supplementary Notes 1 to 4,
wherein the management server further manages analysis procedure information that defines a procedure for specifying the type of the data, and
the data transfer apparatus further acquires the analysis procedure information, and sets the browsing authorization for the data based on the user information, the browsing setting information, the transfer setting information, and the analysis procedure information.

(Supplementary Note 6)
A data transfer apparatus for sharing, between a plurality of services, data output from a sensor that can be used in the services, the apparatus including:
a browsing authorization providing unit for setting, for the data, browsing authorization that allows only a specific user to browse content of the data, based on user information that specifies users who use the services, and browsing setting information that defines, for each type of the data, a user who can browse the content of the data, and for transferring the data for which the browsing authorization is set to a designated transfer destination, based on transfer setting information that designates the transfer destination of the data.

(Supplementary Note 7)
The data transfer apparatus according to Supplementary Note 6,
wherein the sensor continuously outputs the data at set intervals, and
the browsing authorization providing unit sets the browsing authorization for each piece of the data that is continuously output.

(Supplementary Note 8)
The data transfer apparatus according to Supplementary Note 6 or 7,
wherein, in a case where a group of users with the same browsable data type is set, and a group that can browse the content of the data is defined for each type of the data in the browsing setting information,
the browsing authorization providing unit sets, for the data, browsing authorization that allows only a specific group to browse the content of the sensor data, based on the browsing setting information.

(Supplementary Note 9)
The data transfer apparatus according to any one of Supplementary Notes 6 to 8,
wherein, if the data is encoded, the browsing authorization providing unit sets the browsing authorization for the encoded data, and transmits, to the transfer destination, the encoded data for which the browsing authorization is set.

(Supplementary Note 10)
The data transfer apparatus according to any one of Supplementary Notes 6 to 9,
wherein the browsing authorization providing unit acquires analysis procedure information that defines a procedure for specifying the type of the data, and sets the browsing authorization for the data based on the user information, the browsing setting information, the transfer setting information, and the analysis procedure information.

(Supplementary Note 11)
A data transfer method for sharing, between a plurality of services, data output from a sensor that can be used in the services, the method including:
a step (a) of managing user information that specifies users who use the services, browsing setting information that defines, for each type of the data, a user who can browse content of the data, and transfer setting information that designates a transfer destination of the data, by a management server;
a step (b) of acquiring the user information, the browsing setting information, and the transfer setting information from the management server, setting, for the data, browsing authorization that allows only a specific user to browse the content of the data, based on the user information and the browsing setting information, and transferring the data for which the browsing authorization is set to the designated transfer destination, based on the transfer setting information, by a data transfer apparatus; and
a step (c) of determining, upon receiving the data for which the browsing authorization is set, whether or not a specific user has the browsing authorization that is set for the received data, based on the user information, the browsing setting information, and the transfer setting information acquired from the management server, and presenting content of the received data to the specific user if the specific user has the browsing authorization, by a data browsing apparatus.

(Supplementary Note 12)
The data transfer method according to Supplementary Note 11,
wherein the sensor continuously outputs the data at set intervals,
in the step (b), the browsing authorization is set for each piece of the data that is continuously output, and
in the step (c), whether or not a specific user has the browsing authorization is determined for each piece of the data that is continuously output.

(Supplementary Note 13)
The data transfer method according to Supplementary Notes 11 or 12, further including:
a step (d) of setting a group of users with the same browsable data type, based on the user information and the browsing setting information, creating group information that specifies the set group, and defining, in the browsing setting information, a group that can browse the content of data, for each type of the data, by the management server, wherein, in the step (b), the group information is acquired from the management server, and browsing authorization that allows only a specific group to browse the content of the data is set for the data, based on the group information and the browsing setting information.

(Supplementary Note 14)

The data transfer method according to any one of Supplementary Notes 11 to 13, wherein, in the step (b), the data is encoded, the browsing authorization is set for the encoded data, and the encoded data for which the browsing authorization is set is transmitted to the transfer destination.

(Supplementary Note 15)

The data transfer method according to any one of Supplementary Notes 11 to 14, wherein, in the step (a), analysis procedure information that defines a procedure for specifying the type of the data is further managed, and in the step (b), furthermore, the analysis procedure information is acquired, and the browsing authorization is set for the data based on the user information, the browsing setting information, the transfer setting information, and the analysis procedure information.

(Supplementary Note 16)

A computer-readable recording medium storing a program for sharing, between a plurality of services, data output from a sensor that can be used in the services, using a computer, the program including a command to cause the computer to perform:

a step (a) of setting, for the data, browsing authorization that allows only a specific user to browse content of the data, based on user information that specifies users who use the services, and browsing setting information that defines, for each type of the data, a user who can browse the content of the data; and a step (b) of transferring the data for which the browsing authorization is set to a designated transfer destination, based on transfer setting information that designates the transfer destination of the data.

(Supplementary Note 17)

The computer-readable recording medium according to Supplementary Note 16, wherein the sensor continuously outputs the data at set intervals, and in the step (a), the browsing authorization is set for each piece of the data that is continuously output.

(Supplementary Note 18)

The computer-readable recording medium according to Supplementary Note 16 or 17, wherein, in a case where a group of users with the same browsable data type is set, and a group that can browse the content of the data is defined for each type of the data in the browsing setting information, in the step (a), browsing authorization that allows only a specific group to browse the content of the data is set for the data, based on the browsing setting information.

(Supplementary Note 19)

The computer-readable recording medium according to any one of Supplementary Notes 16 to 18, wherein, in the step (b), if the data is encoded, the browsing authorization is set for the encoded data, and the encoded data for which the browsing authorization is set is transmitted to the transfer destination.

(Supplementary Note 20)

The computer-readable recording medium according to any one of Supplementary Notes 16 to 19, wherein, in the step (a), analysis procedure information that defines a procedure for specifying the type of the data is acquired, and the browsing authorization is set for the data based on the user information, the browsing setting information, the transfer setting information, and the analysis procedure information.

Although the invention of the present application has been described above with reference to the embodiment, the invention of the present application is not limited to the above-described embodiment. Configurations and details of the invention of the present application may be changed in various manners that can be understood by those skilled in the art, within the scope of the invention of the present application.

This application claims priority of Japanese Patent Application No. 2016-090725 filed Apr. 28, 2016, the entire disclosure of which is incorporated herein.

INDUSTRIAL APPLICABILITY

As described above, according to the present invention, it is possible to ensure safety in exchanging of sensor data while suppressing an increase in the amount of transferred data in a case of sharing the sensor data between services that use a sensor. The present invention is available in services that use sensors in general.

REFERENCE SIGNS LIST

1 Management server
2 Data transfer apparatus
3 Data browsing apparatus
4 Service server
5 Sensor
6 System administrator
7 User
8 Data transfer system
10 Computer
11 CPU
12 Main memory
13 Storage device
14 Input interface
15 Display controller
16 Data reader/writer
17 Communication interface
18 Input device
19 Display device
20 Recording medium
21 Bus
101 Terminal information input unit
102 Terminal information accumulation unit
103 Analysis procedure information input unit
104 Analysis procedure information accumulation unit
105 User information input unit
106 User information accumulation unit
107 Transfer setting information input unit
108 Transfer setting information accumulation unit
109 Browsing setting information input unit
110 Browsing setting information accumulation unit
111 Group information generation unit
112 Group information accumulation unit
113 Information transmission unit 114 Browsing authorization transmission unit
201 Data receiving unit
202 Data analysis unit
203 Browsing authorization providing unit
204 Data transmission unit
205 Information receiving unit
206 Browsing information receiving unit
301 Data receiving unit
302 Browsing authorization check unit
303 Data display unit
304 Browsing authorization receiving unit

What is claimed is:

1. A data transfer system for sharing, between a plurality of services, data output from a sensor capable of being used in the services, the system comprising:
   a management server for managing user information that specifies users who use the services, browsing setting information that defines, for each type of the data, a user who can browse content of the data, and transfer setting information designates a transfer destination of the data;
   a data transfer apparatus for acquiring the user information, the browsing setting information, and the transfer setting information from the management server, setting, for the data, browsing authorization that allows only a specific user to browse the content of the data, based on the user information and the browsing setting information, and transferring the data for which the browsing authorization is set to the designated transfer destination, based on the transfer setting information; and
   a data browsing apparatus for determining, upon receiving the data for which the browsing authorization is set, whether or not a specific user has the browsing authorization that is set for the received data, based on the user information, the browsing setting information, and the transfer setting information acquired from the management server, and presenting content of the received data to the specific user if the specific user has the browsing authorization.

2. The data transfer system according to claim 1,
   wherein the sensor continuously outputs the data at set intervals,
   the data transfer apparatus sets the browsing authorization for each piece of the data that is continuously output, and
   the data browsing apparatus determines whether or not a specific user has the browsing authorization, for each piece of the data that is continuously output.

3. The data transfer system according claim 1,
   wherein the management server sets a group of users who have the same browsable data type, based on the user information and the browsing setting information, creates group information that specifies the set group, and defines, in the browsing setting information, a group that can browse the content of the data, for each type of the data, and
   the data transfer apparatus acquires the group information from the management server, and sets, for the data, browsing authorization that allows only a specific group to browse the content of the data, based on the group information and the browsing setting information.

4. The data transfer system according to claim 1,
   wherein the data transfer apparatus encodes the data, sets the browsing authorization to the encoded data, and transmits, to the transfer destination, the encoded data for which the browsing authorization is set.

5. The data transfer system according to claim 1,
   wherein the management server further manages analysis procedure information that defines a procedure for specifying the type of the data, and
   the data transfer apparatus further acquires the analysis procedure information, and sets the browsing authorization for the data based on the user information, the browsing setting information, the transfer setting information, and the analysis procedure information.

6. A data transfer apparatus for sharing, between a plurality of services, data output from a sensor that can be used in the services, the apparatus comprising:
   a computer-readable memory having program instructions stored therein;
   a computer processor, configured to execute the program instructions and implement:
      a browsing authorization providing unit for setting, for the data, browsing authorization that allows only a specific user to browse content of the data, based on user information that specifies users who use the services, and browsing setting information that defines, for each type of the data, a user who can browse the content of the data, and for transferring the data for which the browsing authorization is set to a designated transfer destination, based on transfer setting information that designates the transfer destination of the data,
   wherein, in a case where a group of users with the same browsable data type is set, and a group that can browse the content of the data is defined for each type of the data in the browsing setting information,
   the browsing authorization providing unit sets, for the data, browsing authorization that allows only a specific group to browse the content of the data, based on the browsing setting information.

7. The data transfer apparatus according to claim 6,
   wherein the sensor continuously outputs the data at set intervals, and
   the browsing authorization providing unit sets the browsing authorization for each piece of the data that is continuously output.

8. The data transfer apparatus according to claim 6,
   wherein, if the data is encoded, the browsing authorization providing unit sets the browsing authorization for the encoded data, and transmits, to the transfer destination, the encoded data for which the browsing authorization is set.

9. The data transfer apparatus according to claim 6,
   wherein the browsing authorization providing unit acquires analysis procedure information that defines a procedure for specifying the type of the data, and sets the browsing authorization for the data based on the user information, the browsing setting information, the transfer setting information, and the analysis procedure information.

10. A data transfer method for sharing, between a plurality of services, data output from a sensor that can be used in the services, the method comprising:
    a step (a) of managing user information that specifies users who use the services, browsing setting information that defines, for each type of the data, a user who can browse content of the data, and transfer setting information that designates a transfer destination of the data, by a management server;

a step (b) of acquiring the user information, the browsing setting information, and the transfer setting information from the management server, setting, for the data, browsing authorization that allows only a specific user to browse the content of the data, based on the user information and the browsing setting information, and transferring the data for which the browsing authorization is set to the designated transfer destination, based on the transfer setting information, by a data transfer apparatus; and a step (c) of determining, upon receiving the data for which the browsing authorization is set, whether or not a specific user has the browsing authorization that is set for the received data, based on the user information, the browsing setting information, and the transfer setting information acquired from the management server, and presenting content of the received data to the specific user if the specific user has the browsing authorization, by a data browsing apparatus.

11. The data transfer method according to claim 10, wherein the sensor continuously outputs the data at set intervals, in the step (b), the browsing authorization is set for each piece of the data that is continuously output, and in the step (c), whether or not a specific user has the browsing authorization is determined for each piece of the data that is continuously output.

12. The data transfer method according to claim 10, further comprising:

a step (d) of setting a group of users with the same browsable data type, based on the user information and the browsing setting information, creating group information that specifies the set group, and defining, in the browsing setting information, a group that can browse the content of data, for each type of the data, by the management server, wherein, in the step (b), the group information is acquired from the management server, and browsing authorization that allows only a specific group to browse the content of the data is set for the data, based on the group information and the browsing setting information.

13. The data transfer method according to claim 10, wherein, in the step (b), the data is encoded, the browsing authorization is set for the encoded data, and the encoded data for which the browsing authorization is set is transmitted to the transfer destination.

14. The data transfer method according to claim 10, wherein, in the step (a), analysis procedure information that defines a procedure for specifying the type of the data is further managed, and in the step (b), furthermore, the analysis procedure information is acquired, and the browsing authorization is set for the data based on the user information, the browsing setting information, the transfer setting information, and the analysis procedure information.

15. A non-transitory computer-readable recording medium storing a program for sharing, between a plurality of services, data output from a sensor that can be used in the services, using a computer, the program including a command to cause the computer to perform:

a step (a) of setting, for the data, browsing authorization that allows only a specific user to browse content of the data, based on user information that specifies users who use the services, and browsing setting information that defines, for each type of the data, a user who can browse the content of the data; and a step (b) of transferring the data for which the browsing authorization is set to a designated transfer destination, based on transfer setting information that designates the transfer destination of the data, wherein, in a case where a group of users with the same browsable data type is set, and a group that can browse the content of the data is defined for each type of the data in the browsing setting information, in the step (a), browsing authorization that allows only a specific group to browse the content of the data is set for the data, based on the browsing setting information.

16. The non-transitory computer-readable recording medium according to claim 15, wherein the sensor continuously outputs the data at set intervals, and in the step (a), the browsing authorization is set for each piece of the data that is continuously output.

17. The non-transitory computer-readable recording medium according to any one of claim 15, wherein, in the step (b), if the data is encoded, the browsing authorization is set for the encoded data, and the encoded data for which the browsing authorization is set is transmitted to the transfer destination.

18. The non-transitory computer-readable recording medium according to claim 15, wherein, in the step (a), analysis procedure information that defines a procedure for specifying the type of the data is acquired, and the browsing authorization is set for the data based on the user information, the browsing setting information, the transfer setting information, and the analysis procedure information.

* * * * *